US007228426B2

(12) United States Patent
Sinha et al.

(10) Patent No.: US 7,228,426 B2
(45) Date of Patent: Jun. 5, 2007

(54) INTEGRITY ORDAINMENT AND ASCERTAINMENT OF COMPUTER-EXECUTABLE INSTRUCTIONS WITH CONSIDERATION FOR EXECUTION CONTEXT

(75) Inventors: Saurabh Sinha, Seattle, WA (US); Mariusz H. Jakubowski, Bellevue, WA (US); Ramarathnam Venkatesan, Redmond, WA (US); Yuqun Chen, Bellevue, WA (US); Matthew Cary, Seattle, WA (US); Ruoming Pang, Shanghai (CN)

(73) Assignee: Microsoft Corporation, Redmond, WA (US)

( * ) Notice: Subject to any disclaimer, the term of this patent is extended or adjusted under 35 U.S.C. 154(b) by 824 days.

(21) Appl. No.: 10/116,263

(22) Filed: Apr. 3, 2002

(65) Prior Publication Data

US 2003/0191940 A1    Oct. 9, 2003

(51) Int. Cl.
*H04L 9/00* (2006.01)
*G06F 11/00* (2006.01)
*G06F 12/14* (2006.01)
*G06F 12/16* (2006.01)
*G06F 15/18* (2006.01)

(52) U.S. Cl. ............................ 713/176; 726/23; 726/24
(58) Field of Classification Search .................. 726/23, 726/24; 713/176
See application file for complete search history.

(56) References Cited

U.S. PATENT DOCUMENTS

| 5,050,212 | A | 9/1991 | Dyson |
| 5,548,759 | A | 8/1996 | Lipe |
| 5,708,811 | A | 1/1998 | Arendt et al. |
| 5,764,987 | A | 6/1998 | Eidt et al. |
| 6,141,698 | A | 10/2000 | Krishnan et al. |
| 6,393,594 | B1* | 5/2002 | Anderson et al. ........... 714/738 |
| 6,636,942 | B2 | 10/2003 | Greco |
| 6,687,749 | B1 | 2/2004 | Chavez et al. |
| 6,742,176 | B1 | 5/2004 | Million et al. |
| 7,080,249 | B1 | 7/2006 | Jakubowski et al. |
| 2002/0166062 | A1 | 11/2002 | Helbig, Sr. |

OTHER PUBLICATIONS

Chen, Yugun et al. "Oblivious Hashing: A Stealthy Software Integrity Verification Primitive", 2002.*
Gong, Li. Inside Java 2 Platform Security, Architecture, API Design and Implementation, Jun. 1999 Sun Microsystems, pp. 21-25.*
Lin, Chun-Liang et al. "Tamper-proofing of Java Programs by Oblivious Hashing", 2005.*

(Continued)

*Primary Examiner*—Kambiz Zand
*Assistant Examiner*—Michael J. Simitoski
(74) *Attorney, Agent, or Firm*—Lee & Hayes, PLLC

(57) ABSTRACT

An implementation of a technology, described herein, for facilitating the protection computer-executable instructions, such as software. At least one implementation, described herein, may generate integrity signatures of one or more program modules—which are sets of computer-executable instructions—based upon a trace of activity during execution of such modules and/or near-replicas of such modules. With at least one implementation, described herein, the execution context of an execution instance of a program module is considered when generating the integrity signatures. With at least one implementation, described herein, a determination may be made about whether a module is unaltered by comparing integrity signatures. This abstract itself is not intended to limit the scope of this patent. The scope of the present invention is pointed out in the appending claims.

16 Claims, 14 Drawing Sheets

OTHER PUBLICATIONS

Monrose, Fabian et al. "Distributed Execution with Remote Audit", 1999.*

Thomas, Roshan. "A Survey of Mobile Code Security Techniques", Oct. 1999.*

Vigna, Giovanni. "Protecting Mobile Agents Through Tracing," Proceedings of the 3rd ECOOP Workshop on Mobile Object Systems, Jun. 1997, <http://www.cs.ucsb.edu/vigna/listpub.html>.*

Zachary, John. "Protecting Mobile Code in the Wild", 2003 IEEE.*

* cited by examiner if [Signature 112] = [Signature 132] , then

[Yellow Module 160] is <u>Unmodified</u> if [Signature 112] ≠ [Signature 132] , then

[Yellow Module 160] is <u>Modified</u>

INTEGRITY ORDAINMENT AND ASCERTAINMENT OF COMPUTER-EXECUTABLE INSTRUCTIONS WITH CONSIDERATION FOR EXECUTION CONTEXT

TECHNICAL FIELD

This invention generally relates to a technology for facilitating the protection computer-executable instructions, such as software.

BACKGROUND

Digital goods (e.g., software products, data, content, etc.) are often distributed to consumers via fixed computer readable media, such as a compact disc (CD-ROM), digital versatile disc (DVD), soft magnetic diskette, or hard magnetic disk (e.g., a preloaded hard drive). More recently, content is being delivered in digital form online over private and public networks, such as Intranets and the Internet. Online delivery improves timeliness and convenience for the user, as well as reduces delivery costs for a publisher or developers. Unfortunately, these worthwhile attributes are often outweighed in the minds of the publishers/developers by a corresponding disadvantage that online information delivery makes it relatively easy to obtain pristine digital content and to pirate the content at the expense and harm of the publisher/developer.

One concern of the publisher/developer is the ability to check digital content, after distribution, for alteration. Such checking is often referred to as SRI (Software Resistance to Interference). The reasoning for the desire to check for such alterations may vary (e.g., to ensure that the content continues to operate as intended by the publisher/developer, to protect against improper copying, etc.).

The unusual property of content is that the publisher/developer (or reseller) gives or sells the content to a client, but continues to restrict rights to use the content even after the content is under the sole physical control of the client. For instance, a software developer typically sells a limited license in a software product that permits a user to load and run the software product on one or more machines (depending upon the license terms), as well as make a back up copy. The user is typically not permitted to make unlimited copies or redistribute the software to others.

These scenarios reveal a peculiar arrangement. The user that possesses the digital bits often does not have full rights to their use; instead, the provider retains at least some of the rights. In a very real sense, the legitimate user of a computer may be an adversary of the data or content provider.

DRM Techniques

One of the uses for SRI (Software Resistance to Interference) is to provide "digital rights management" (or "DRM") tamper-resistance (i.e., protection) to prevent unauthorized modification, distribution, copying, and/or illegal operation of, or access to the digital goods. An ideal digital goods distribution system would substantially prevent unauthorized modification/distribution/use of the digital goods.

Digital rights management is fast becoming a central requirement if online commerce is to continue its rapid growth. Content providers and the computer industry must quickly address technologies and protocols for ensuring that digital goods are properly handled in accordance with the rights granted by the developer/publisher. If measures are not taken, traditional content providers may be put out of business by widespread theft or, more likely, will refuse altogether to deliver content online.

Various DRM techniques have been developed and employed in an attempt to thwart potential pirates from illegally copying or otherwise distributing the digital goods to others.

Original Media Required

For example, one conventional DRM technique includes requiring the consumer to insert the original CD-ROM or DVD for ascertainment prior to enabling the operation of a related copy of the digital good. Unfortunately, this DRM technique typically places an unwelcome burden on the honest consumer, especially those concerned with speed and productivity. Moreover, such techniques are impracticable for digital goods that are site licensed, such as software products that are licensed for use by several computers, and/or for digital goods that are downloaded directly to a computer. Additionally, it is not overly difficult for unscrupulous individuals/organizations to produce working pirated copies of the CD-ROM.

Registration

Another conventional DRM technique includes requiring or otherwise encouraging the consumer to register the digital good with the provider. For example, this is often done either through the mail or online via the Internet or a direct connection. Thus, the digital good may require the consumer to enter a registration code before allowing the digital good to be fully operational or the digital content to be fully accessed. Unfortunately, such DRM techniques are not typically effective since unscrupulous individuals/organizations need only undermine the DRM protections in a single copy of the digital good. Once broken, copies of the digital good may be illegally distributed; hence, such DRM techniques are considered to be Break-Once, Run-Everywhere (BORE) susceptible. Various techniques may be used to overcome some of the BORE susceptible, such as per-user software individualization, watermarks, etc. However, a malicious user may still be able to identify and remove from the digital good these various protections.

Code Obfuscation

Still another DRM technique is an emerging one called "code obfuscation" or "code scrambling." Code obfuscation is described, to some degree, in the following co-pending patent applications:

U.S. patent application Ser. No. 09/670,916, entitled "Code Integrity Verification that Includes One or More Cycles" filed on Sep. 29, 2000.

U.S. patent application Ser. No. 09/536,033, entitled "System and Method for Protecting Digital Goods using Random and Automatic Code Obfuscation" filed on Mar. 27, 2000;

U.S. patent application Ser. No. 09/651,424, entitled "Method and System for Using a Portion of a Digital Good as a Substitution Box" filed on Aug. 30, 2000; and U.S. patent application Ser. No. 09/651,901, entitled "Protecting Digital Goods using Oblivious Checking" filed on Aug. 30, 2000.

Code obfuscation thwarts would-be software pirate's attempt to attack the licensing provisions in digital goods (such as software). It also thwarts malicious would-be interlopers when they attempt to modify the security portions of such digital goods. In either case, existing code obfuscation techniques complicate an attacker's attempt to locate and identify specific portions of code within a software program (such as the operating system or an application).

Code obfuscation techniques effectively "hide" (i.e., obfuscate) or "scramble" the underlying code of a digital good, thereby making it difficult for a would-be attacker to locate and identify portions of the code.

Although it may be difficult, an attacker may be able to overcome code obfuscation. For example, an attacker may track the execution instance of the software program to identify where and when specific actions are performed. Once an attacker identifies and locates specific portions of code, she may modify it. Conventional code obfuscation cannot prevent code modification. Conventional code obfuscation cannot detect when code has been modified.

Code Modification

As stated above, the publisher/developer would like the ability to check digital content, after distribution, for alteration. The reasons for checking for such alterations may vary (e.g., to ensure that the content continues to operate as intended by the publisher/developer, to protect against improper copying, etc.). However, conventional DRM techniques do not actually check for alteration of digital content, such as software code.

Strictly speaking, conventional DRM techniques are chiefly designed to complicate code analysis by the digital pirate. They erect barriers and obstacles to unauthorized use of the software and/or unauthorized access the underlying code. However, they cannot detect code modification (i.e., alternation).

Accordingly, there is a challenge for a DRM technique to increase tamper resistance by detecting code modification without imposing unnecessary and burdensome requirements on legitimate users.

Remote Code Ascertainment

"Remote code ascertainment" is another realm that lacks the capability to effectively detect code modifications. A generic example of "remote code ascertainment" is the following: a computing entity (e.g., server) may ensure that only authorized (e.g., unaltered) computing entities (e.g., a client software program) connect via a remote coupling and that such remote entities remain free from tampering. This is also called: "persistent remote authentication."

Some systems, such as those employing Internet instant-messaging systems, include a small, simple client program that connects to a secure server over a network. Deployers of such systems may require that only authorized, unmodified client software use the servers.

How does the server in such a system ascertain that the client software with which it is communicating is unmodified, unaltered, unadulterated, untainted, etc. by the devious hands of malicious would-be infiltrator? The issue here is not whether the proper security protocol is followed and the proper security information is provided. Rather the issue is whether the server may be certain that the security features of the client software have not been hijacked by a malicious would-be infiltrator.

Generally speaking, for an experienced software expert, it is not particularly difficult to reverse engineer the client-server communications. Therefore, an attacker may create a fully functional but unauthorized client program. Moreover, an attacker may patch the original code or data of authorized client software to instruct it to perform unauthorized and undesirable actions.

Traditional authentication protocols do not address the problem described. Unauthorized parties may reverse engineer such protocols and write new software to implement them. An attacker may modify a client program's code or data without changing its implementation of an authentication protocol. Traditional protocols do not address code tampering.

Accordingly, there is a challenge for a technique to confirm the veracity of a remote software program. Conventionally, it is a challenge to effectively thwart maliciously modified programs from harming a network system by preventing their initial passage through the security layers by masquerading as the original and unaltered program.

The Challenge of Accurately Detecting Code Modification

Accordingly, it is a challenge for a technique to address the concerns of the publisher/developer in protecting their rights in a digital good, such as software. Specifically, it is a challenge for to detect an alteration of the digital content without imposing unnecessary and burdensome requirements on legitimate users.

Furthermore, it is a challenge for to test the veracity of a remote software program. Specifically, it is a challenge for to detect a modified program so that it cannot impersonate the original and unaltered program.

SUMMARY

Described herein is a technology for facilitating the protection computer-executable instructions, such as software.

At least one implementation, described herein, may generate integrity signatures of one or more program modules—which are sets of computer-executable instructions—based upon a trace of activity during execution of such modules and/or near-replicas of such modules. With at least one implementation, described herein, the execution context of an execution instance of a program module is considered when generating the integrity signatures. With at least one implementation, described herein, a determination may be made about whether a module is unaltered by comparing integrity signatures.

With at least one implementation, described herein, a trace record is generated and such recorded may be obfuscated. Furthermore, with at least one implementation, described herein, the one or more near-replicas of program modules are hidden.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

Figure 1A:
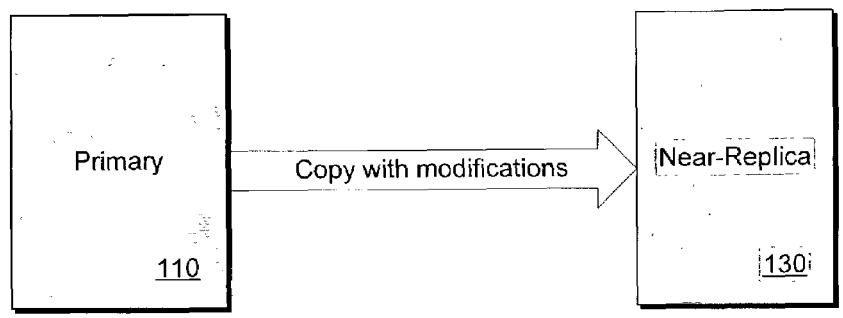
FIGS. 1A–1F are block diagrams illustrating some of the components manipulated by an implementation described herein and some of their relationships and associations with each other within the context of the implementation.

The following description sets forth one or more specific embodiments of integrity ordainment and ascertainment of computer-executable instructions with consideration for execution context that incorporate elements recited in the appended claims. These embodiments are described with specificity in order to meet statutory written description, enablement, and best-mode requirements. However, the description itself is not intended to limit the scope of this patent.

The one or more specific embodiments, described herein, are exemplary implementations of an integrity ordainment and ascertainment of computer-executable instructions with consideration for execution context. The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of an integrity ordainment and ascertainment of computer-executable instructions with consideration for execution context may be referred to as an "exemplary integrity ordainer/ascertainer." Alternatively, it may be called an "exemplary integrity veracitor." The exemplary integrity veracitor may include an exemplary integrity ordainer and/or an exemplary integrity ascertainer.

Incorporation by Reference

The following co-pending patent application is incorporated by reference herein: U.S. patent application Ser. No. 10/116,440, entitled "Integrity Ordainment and Ascertainment of Computer-Executable Instructions" and assigned to the Microsoft Corporation;

Brief Glossary

To aid the reader, the following brief glossary is provided as a quick reference to the definitions of terms that are otherwise not common in the art. This glossary primarily covers terms related to the color-coding of computer-executable instructions (i.e., code). This color-coding is purely for explanatory purposes only. Of course, such code has no actual color, but if it did, the actual color plays no functional role.

Integrity Veracitication—this includes integrity ordainment and integrity ascertainment. "Veracitication" is noun form of a verb form of the word "veracity," which generally means "adherence to the truth; truthfulness; conformity to fact or truth; something that is true."

Integrity Ordainment—this may be thought of as the front-end of integrity veracitication. "Ordainment" is noun form of the word "ordain," which generally means, "to prearrange unalterably." Implementations of integrity ordainment techniques may employ execution tracing and hashing, output tracing and hashing, or a combination of both.

Integrity Ascertainment—this may be thought of as the back-end of integrity veracitication. "Ascertainment" is noun form of the word "ascertain," which generally means, "to discover with certainty, as through examination or experimentation." This may also be called "integrity verification."

Primary code 110—original computer-executable instructions (i.e., "code") of a program module of a digital good. The primary code 110 may have hidden, special-purpose instructions that are strategically, distributively inserted within the clear code. These hidden instructions may be called "black code." Alternatively, primary code may refer to same instructions after it is obfuscated using code obfuscation techniques.

Near-Replica code 130—slightly modified replica (i.e., "near-replica") of the primary code 110. With at least one implementation, this code is the result of integrity ordainment performed on the primary code 110.

Code 120—this code of a program module may be either the primary code 110 or its near-replica code 130.

Red Module 150—modified code of a program module; code after it has been modified by a pirate; code that is determined and/known to be modified. This modified code may have been the primary code 110 or its near-replica code 130.

Yellow Module 160—code of a program module that is suspected of having been modified (i.e., it is subject of detection tests). With at least one implementation, this is code that is the subject of integrity ascertainment tests.

Parameters 142—herein, this refers to one or more specific input parameters that are passed to a program module (i.e., function, set of instructions, etc.) that are used to generate one or more signatures.

External Factors 144—herein, this refers to factors that are external to a program module, but may affect a module's execution instance and/or may be affected by such execution instance. Typically, this will include factors, such as: heaps, stacks, global variables, and the like.

Execution Context 140—herein, this refers to context in which a program module executes. It includes, for example: input parameters 142 and external factors 144.

Primary signature 112—a signature is a specific value that identifies the execution instance of a program module (in this case, of the primary code) based upon specified execution context. With at least one implementation, a primary signature is one generated during integrity ordainment and/or integrity ascertainment. According to at least one implementation, it employed in a determination of the code of a module has been modified.

Near-Replica signature 132—a signature is a specific value that identifies the execution instance of a program module (in this case, of the near-replica code) based upon specified execution context. With at least one implementation, a primary signature is one generated during integrity ordainment and/or integrity ascertainment. According to at least one implementation, it employed in a determination of the code of a module has been modified.

Integrity Veracitication

The one or more exemplary implementations, described herein, of the present claimed invention may be implemented (in whole or in part) by an integrity veracitication system. The integrity veracitication system may be part of a digital rights management (DRM) distribution architecture 400; and/or a computing environment like that shown in FIG. 13. It may be implemented by an integrity ordainer 470; an integrity ascertainment system; and/or a computing environment like that shown in FIG. 13.

At least one implementation, may generate integrity signatures of one or more program modules—which are sets of computer-executable instructions—based upon a trace of activity during execution of such modules and/or near-replicas of such modules. With at least one implementation, the execution context (including, for example, external factors and input parameters) of an execution instance of a program module is considered when generating the integrity signatures. With at least one implementation, a determination may be made about whether a module is unaltered by comparing integrity signatures.

With at least one implementation, a trace record is generated and such recorded may be obfuscated. Furthermore, with at least one implementation, the one or more near-replicas of program modules are hidden.

One or more implementations of "integrity veracitication", described herein, may be combined with one or more implementations of the form "integrity veracitication" techniques (e.g., execution tracing and/or output tracing) described in U.S. patent application Ser. No. 10/116,440, entitled "Integrity Ordainment and Ascertainment of Computer-Executable Instructions".

Integrity Ordainment

With at least one implementation of an integrity ordainment technique, described herein, may employ execution tracing in a manner similar to that described in U.S. patent application Ser. No. 10/116,440, entitled "Integrity Ordainment and Ascertainment of Computer-Executable Instructions". Thus, so-called "black code" or hidden instructions may be inserted to accomplish execution tracing.

With at least one implementation of an integrity ordainment technique, hidden instructions are inserted within a program module of the digital good. This program module may be the "primary" module. When the primary module is executed, these hidden instructions generate an execution trace of various morsels of data. This implementation generates a primary-integrity signature based upon the execution trace of an execution instance of the primary module with a specified execution context.

With at least one implementation of an integrity ordainment technique, a near-replica of the primary program module of the digital good is employed. This program module may be the "near-replica" module because it is a replica or a near replica of the primary module. When the near-replica module is executed, the hidden instructions generate an execution trace of various morsels of data. This implementation generates a near-replica-integrity signature based upon the execution trace of an execution instance of the primary module with a specified execution context.

With at least one implementation of an integrity ordainment technique, the primary-integrity signature and the near-replica-integrity signature are compared. With this comparison, it may be determined whether a module—primary or near-replica—has been modified without actually examining the code of a module.

Although code obfuscation may be used to limit code accessibility and to make code modification more difficult to accomplish, the tamper-resistance (i.e., protection) afforded by one or more implementations, described herein, enables detection of alterations to the executable instructions of a digital good. Consequently, one or more alternative implementations may combine code obfuscation with the integrity ordainment techniques.

Rather than employing execution tracing, one or more implementations of an integrity ordainment technique, described herein, may employ output tracing in a manner similar to that described in U.S. patent application Ser. No. 10/116,440, entitled "Integrity Ordainment and Ascertainment of Computer-Executable Instructions".

Primary and Near-Replica Modules

Figure 2:
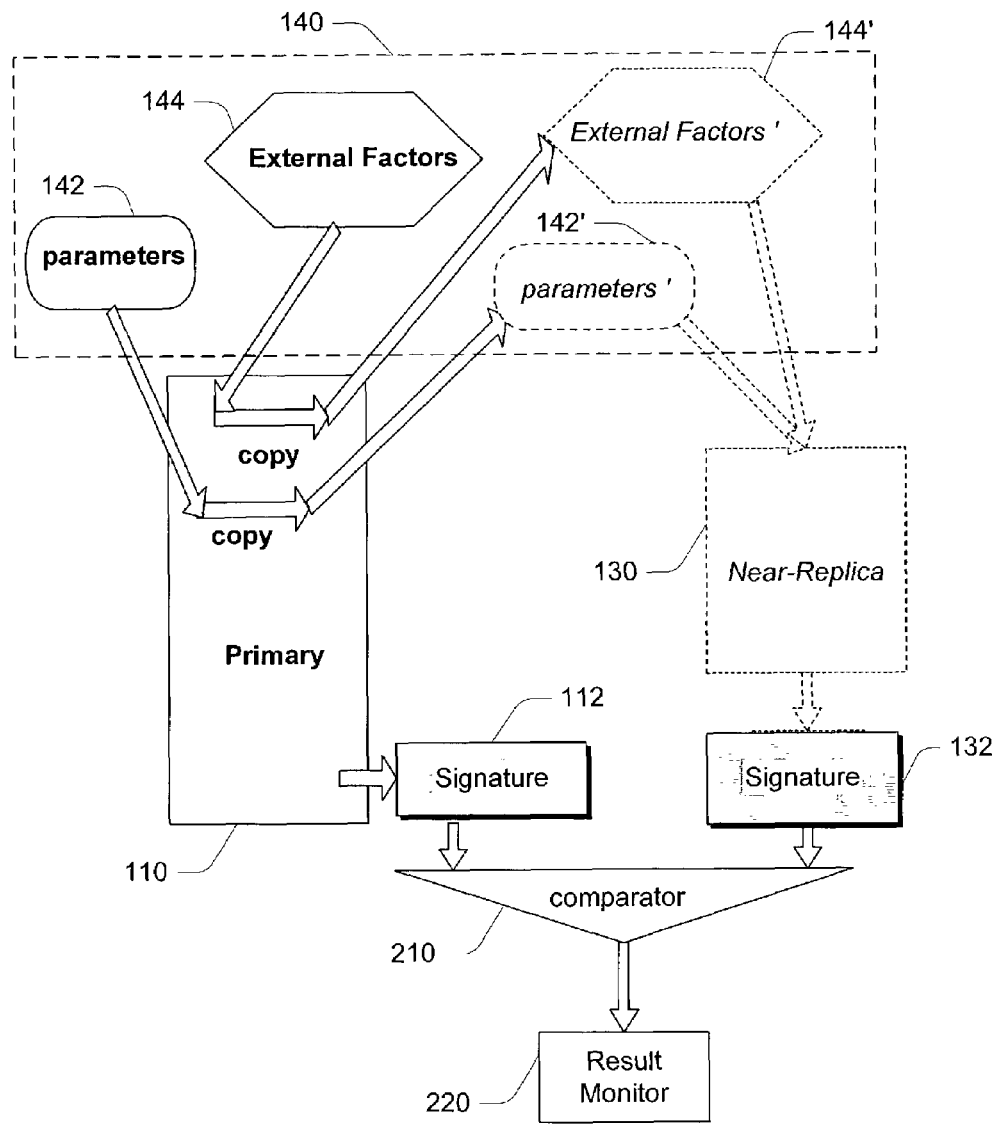
FIG. 2 is a block diagram graphically illustrating actions performed by an embodiment described herein and some of the components manipulated by such.

FIG. 1A illustrates an implementation where a copy of a primary program module 110 is made to generate a near-replica program module 130. The primary module 110 may be one containing "black code" and/or one with code obfuscation. FIG. 2 also shows the primary program module 110 and its near-replica 130.

In some implementations, this may be an exact copy—without modifications—of the primary. In others, it may be a near-copy, which is a copy having some modifications. Examples of these modifications are described later. As discussed later, one purpose of the modifications is to simulate the primary module's execution context for an execution instance of the near-replica.

Execution Context and Signatures

Figure 1B:
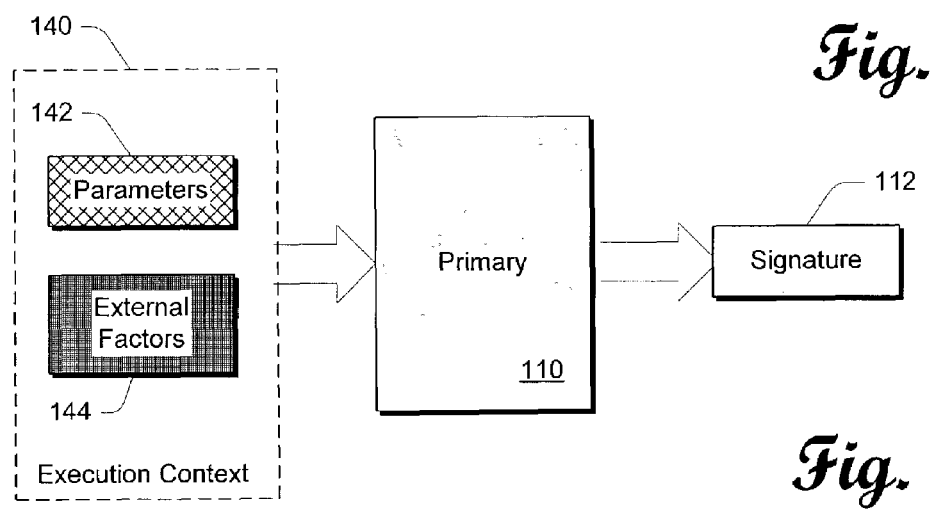

FIG. 1B illustrates an implementation where a primary-integrity-signature 112 is generated based upon one or more execution instances of the primary module 110 with a known execution context 140 (for one or more execution instances). That context expressly includes input parameters 142 of the module and external factors 144. The execution context 140 is known because it is specified and/or recorded for an execution instance. Signature 112 may be based upon execution tracing and/or output tracing.

FIG. 2 also shows the primary module 110 and its primary-integrity-signature 112.

Figure 1C:
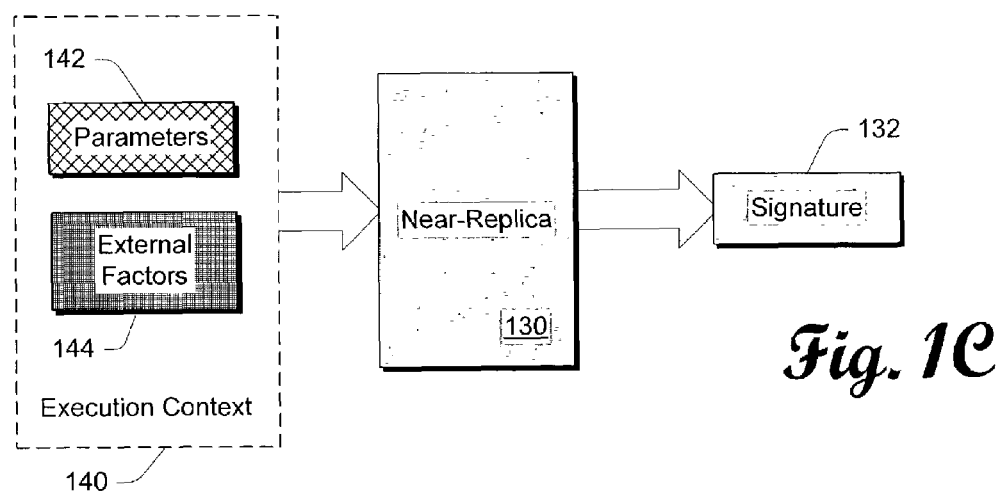

FIG. 1C illustrates an implementation where a near-replica-integrity-signature 132 is generated based upon one or more execution instances of the near-replica module 130 with the known execution context 140 (for one or more execution instances). Since the context 140 of FIG. 1C for the near-replica is the context 140 of FIG. 1B for the primary, the near-replica-integrity-signature 132 is indistinguishable from the primary-integrity signature 112. Signature 132 may be based upon execution tracing and/or output tracing.

FIG. 2 also shows the near-replica module 130 and its near-replica-integrity-signature 132.

In addition, FIG. 2 shows the execution context 140. This context includes the input parameters 142 and external factors 144 for the primary module 110. It also includes the input parameters 142' and external factors 144' for the near-replica module 130. With at least one implementation, the primary module generates a copy (i.e., a record) of its parameters 142 and external factors 144. The result of that act is represented by parameters 142' and external factors 144'. These stored parameters 142' and external factors 144' are provided to the near-replica 130 when it generates a signature 132.

Red Module

Figures 1D, 1E, 1F:
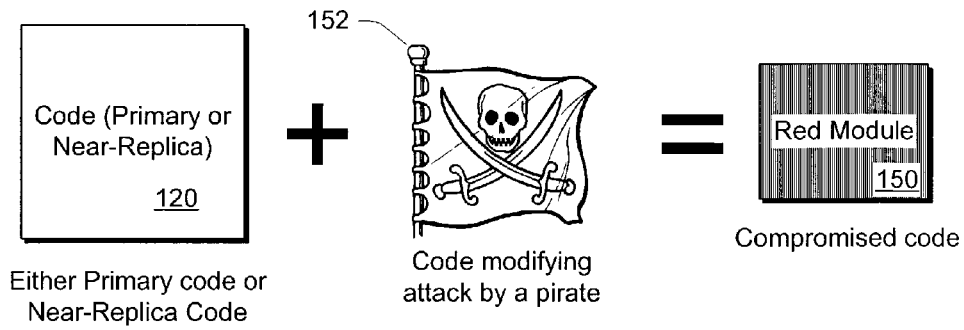

FIG. 1D illustrates a malicious attack 152 by a digital pirate on either a primary or its near-replica module 120 ("primary/near-replica code" 120). Consequently, the computer-executable instructions of the red module 150 are compromised. A module having code that has actually been modified (i.e., modification has been detected) is called a "red module."

Yellow Code

To continue the metaphor further, a module (such as module 160) having code that is suspected of having been modified is called a "yellow module." It is not known whether such code of such a module is modified or not.

Integrity Ascertainment

With at least one implementation of an integrity ascertainment technique, the integrity of a program module of a digital good is ascertained. As such, a determination is made regarding whether one or more computer-executable instructions of the program module of the digital good have been altered. This technique is called "integrity ascertainment," herein.

Comparison of Signatures

With at least one implantation, the primary-integrity-signature 112 of the primary code 110 of a yellow module 160 is generated during integrity ordainment. Likewise, with at least one implantation, the near-replica-integrity-signature 132 of the near-replica code 130 of the yellow module 160 is generated during integrity ordainment.

As shown in FIGS. 1E and 1F, these signatures are compared during integrity ascertainment. FIG. 1E shows that if there is a match, then the primary 110 and its near-replica module 130 remain unmodified. FIG. 1F shows that, otherwise either the primary 110 or its near-replica module 130 has been modified from its original state.

As shown in FIG. 2, with at least one implementation, the signature 112 and 132 are compared by a comparator 210 which generates a result that goes to a monitor 220.

Execution and/or Output Tracing

The exemplary integrity veracitor may employ execution tracing and hashing, output tracing and hashing, or a combination of both. Generally, with execution tracing and hashing, the execution instance of a program module is traced and the result of such is hashed to generate an execution-trace signature. Generally, with output tracing and hashing, the output of a program module is traced and the result of such is hashed to generate an output-trace signature.

Execution tracing and hashing and output tracing and hashing are described in U.S. patent application Ser. No. 10/116,440, entitled "Integrity Ordainment and Ascertainment of Computer-Executable Instructions".

Execution tracing and hashing and output tracing and hashing may employ oblivious hashing techniques as described in U.S. patent application Ser. No. 10/116,440, entitled "Integrity Ordainment and Ascertainment of Computer-Executable Instructions".

Execution Context

The exemplary integrity veracitor is particularly applicable to program modules (i.e., functions) that are not necessarily deterministic with respect to input parameters alone. Instead, the exemplary integrity veracitor factors in the entire context of a module's execution instance.

Of course, those factors include the input parameters of the module, but it may also include factors external to the module itself. Examples of such factors include virtual memory states, operating system states, input/output (I/O) system calls, other processes, system environment stacks, and heaps. Other examples include reading static global variables, reading files or other external data, and the system clock.

Presumably, an execution of a primary module and its exact replica will yield identical signatures (e.g., oblivious hashes) if each have the identical execution context. However, the implementation of that statement is not as straightforward as it seems.

Execution Context Record

First, determining a closure of global data that a module accesses and modifies is an undecidable problem in the abstract, and an extremely difficult problem in practice. Second, for a multi-threaded application, the global data that is modified during a forced call there within may cause other threads to misbehave. Although one may try suspending other threads during a forced call or play with virtual memory protection, these techniques also reveal to the hackers the protection scheme and location.

In addition, pre-determining a known set of execution contexts in order to stress test a module is not easily automated, for the same reason why it is difficult to determine the closure for a module's global data access. At best, one may design semi-automatic tools to help programmers generate the set of known execution contexts. That may just be impractical.

Instead of forced calls with known execution contexts, one may try to verify a module as it is being invoked naturally. In order to do this, a near-replica of the primary module is employed to "replay" its execution, and thereby obtain and verify the resulting signature. The primary module—within which may be embedded hidden code (such as that for execution tracing and hashing)—produces a record of its execution context in a secret location.

At some point later, the near-replica is invoked with the saved context to generate a signature. Since the execution context is captured as the primary executes, arbitrary input parameters and global data accesses may be fed to the near-replica.

Capturing Execution Context

Given the same execution context, a module and its replica will execute identically and hence produce indistinguishable integrity signatures. It is a highly non-trivial task to determine at the compile time what global data a module may access during its invocation.

One of the characteristics of a module's interface with external factors is that references to external factors are made by individual read and write instructions. With at least one implementation, a replica of a module may be modified—thereby producing a near-replica—so that its "read" instructions retrieves the actual value read by the primary during its invocation. During the near-replica's invocation, it does not simply read a value from the same location from which the primary read. That is because that value may have changed since the primary read it. Rather, the near-replica retrieves the actual value read by the primary during its invocation from a specified memory location (i.e., trace record).

Figure 3:
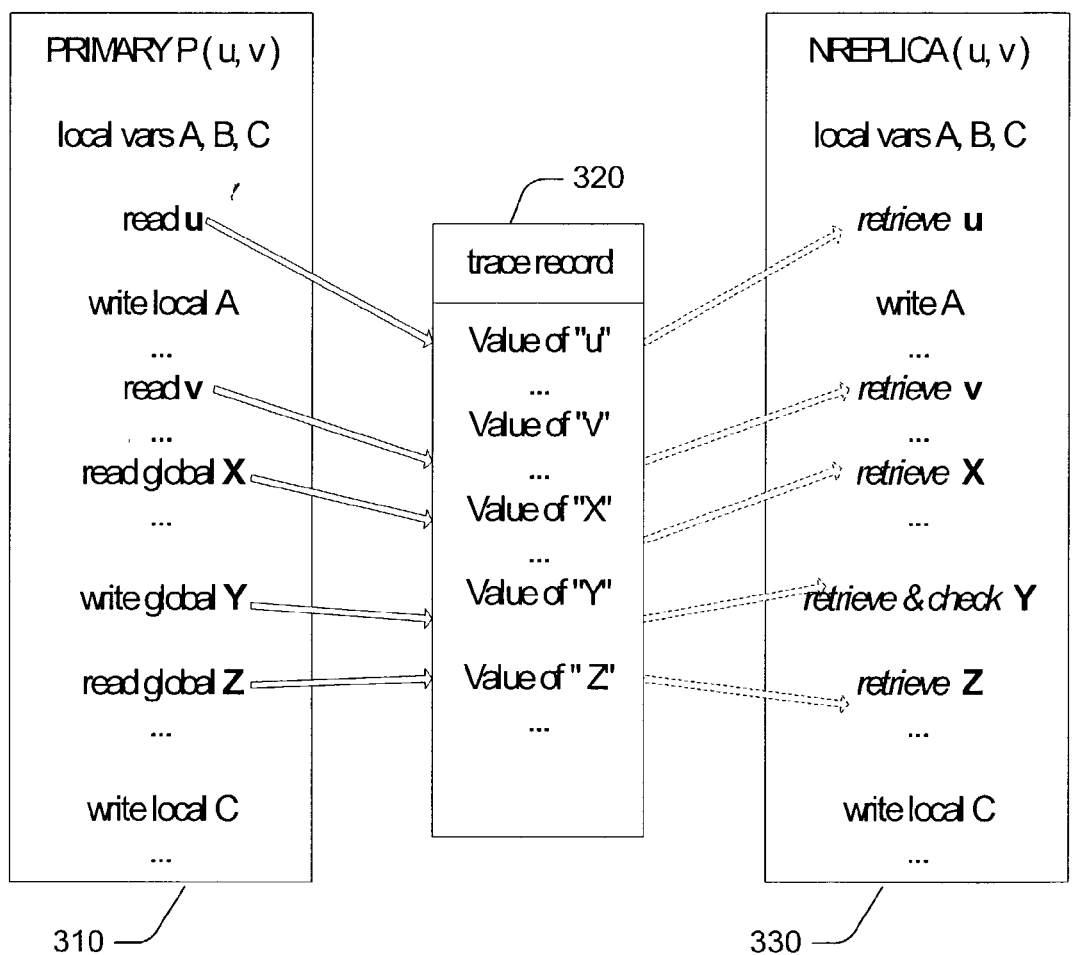
FIG. 3 is a block diagram graphically illustrating actions performed by an embodiment described herein and some of the components manipulated by such.

As shown in FIG. 3, every read from an external source (e.g., a heap) of a primary module 310 places the result of the read in a trace record (such as record 320 of FIG. 3), which corresponds to that primary module. Similarly, every write to an external source results in the to-be-written value placed similarly in the trace record. With at least one implementation, the trace record is organized in a first-in, first-out (FIFO) manner.

As shown in FIG. 3, in the near-replica module 330, every read instruction (of the primary module) that gets data from an external source (e.g., a heap) is converted into a retrieval operation (within the near-replica) from the corresponding trace record (such as record 320 of FIG. 3). In other words, the read instructions (from an external source) of the primary module are converted to retrieval instructions from the corresponding trace record within the near-replica module.

Similarly, every write instruction (of the primary module) that stores data to an external source extracts a value from the trace record and compares the value with that it is supposed to write. In other words, the write instructions (to an external location) of the primary module are converted to retrieval & check instructions from the corresponding trace record within the near-replica module.

At least one implementation employs an unbounded trace record because the primary module may contain a loop that may generate many insertions to the trace record.

With at least one implementation, the trace record used for storing the read and write results may be allocated for the entire module as illustrated in FIG. 3.

Hiding the Near-Replica

A clever attacker may be able to spot the near-replica module within the digital good. To hide the location of a near-replica module, the basic blocks of the near-replica module may be broken up and spread throughout some portion of the digital good.

DRM Distribution Architecture

A digital rights management (DRM) distribution architecture produces and distributes digital goods in a fashion that renders the digital goods resistant to many known forms of attacks or makes such attacks detectable.

Digital Goods

Essentially any type of digital good may be protected using this architecture, including such digital goods as software, audio, video, and other content. For discussion purposes, many of the examples are described in the context of software goods and in particular goods that include computer-executable instructions. However, the techniques described herein may be effective for other digital goods (such as audio data, video data, and other forms of multimedia data) if they include some form of computer-executable instructions.

Architecture

Figure 4:
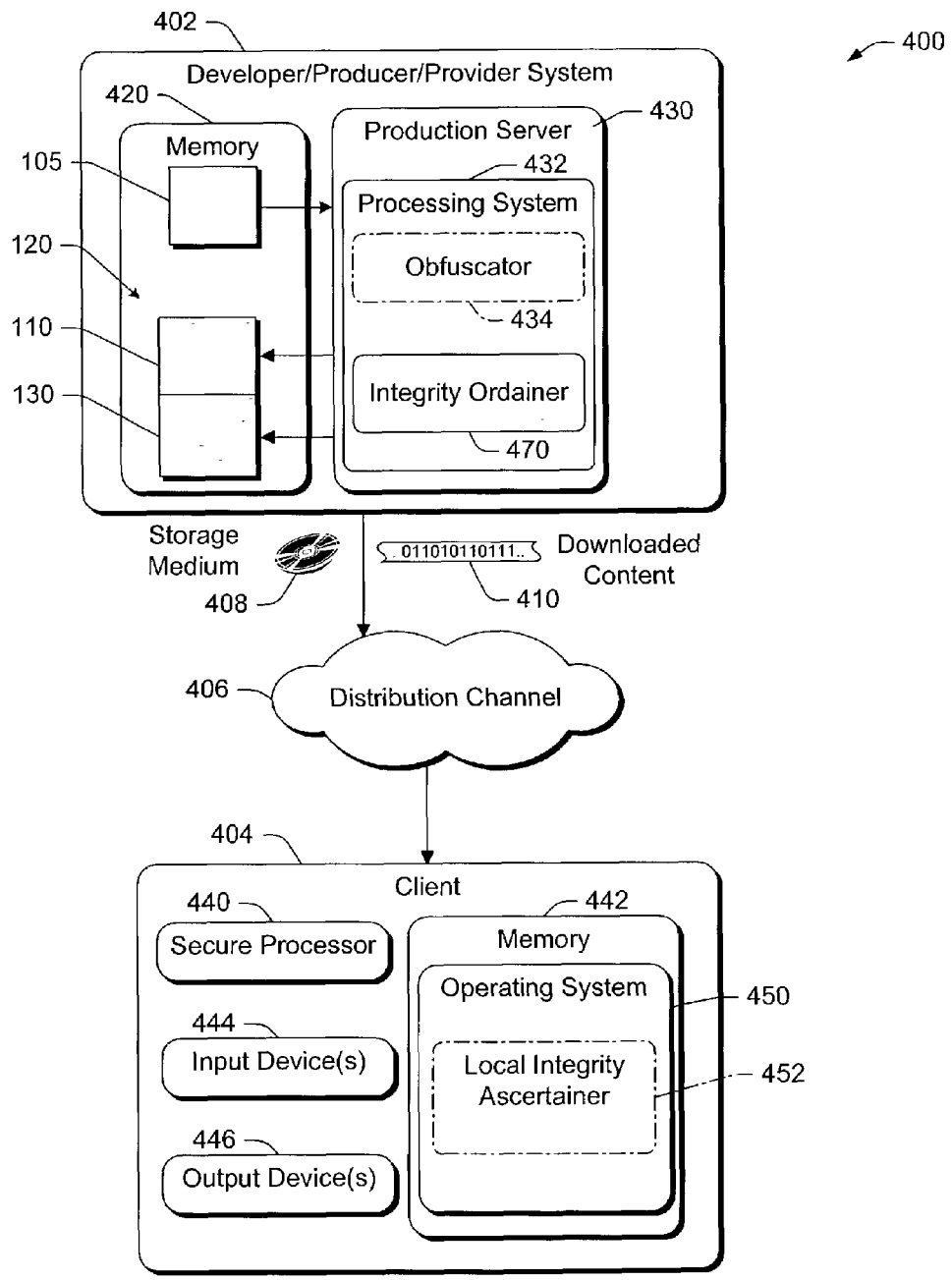
FIG. 4 illustrates an example of a digital rights management (DRM) distribution architecture in accordance with an implementation described herein.

FIG. 4 shows a DRM distribution architecture 400 in which unprotected (i.e., modification-undetectable) digital goods are transformed into protected (i.e., modification-detectable) digital goods and distributed in their protected form. This involves the employment of integrity ordainment, as described here.

The architecture 400 has a developer/producer/provider system 402 that develops or otherwise produces the protected good and distributes the protected good to a client 404 via some form of distribution channel 406. The protected digital goods may be distributed in many different ways. For instance, the protected digital goods may be stored on a computer-readable medium 408 (e.g., CD-ROM, DVD, floppy disk, etc.) and physically distributed in some manner, such as conventional vendor channels or mail. Alternatively, the protected goods may be downloaded over a network (e.g., the Internet) as streaming content or files 410.

The developer/producer system 402 has a memory (e.g., memory 420 and 460) to store an original module 105 (i.e., clear code) from a digital good, as well as a protected module 120. Using the integrity ordainer 470, the protected module 120 is generated from the original module 105 (i.e., clear code). With at least one implementation, the protected module includes a primary module 110 and its near-replica module 130.

The system 402 also has a production server 430 that transforms the clear code 110 into the green code 130 that is suitable for distribution. The production server 430 has a processing system 432 and implements an integrity ordainer 470.

The integrity ordainer 470 is the exemplary integrity ordainer of the exemplary integrity veracitor, described herein.

Alternatively, the processing system 432 may include an obfuscator 434. The obfuscator 434 obfuscates the digital good. While obfuscation makes it extremely difficult for pirates to modify the original digital goods, it does not prevent it. A pirate may fool a conventional obfuscator and modify the digital good without detection.

The developer/producer system 402 is illustrated as a single entity, with memory and processing capabilities, for ease of discussion. In practice, however, the system 402 may be configured as one or more computers that jointly or independently perform the tasks of transforming the original digital good into the protected digital good.

The client 404 has a secure processor 440, memory 442 (e.g., RAM, ROM, Flash, hard disk, CD-ROM, etc.), one or more input devices 444 (e.g., keyboard, joystick, voice recognition, etc.), and one or more output devices 446 (e.g., monitor, speakers, etc.). The client may be implemented as a general-purpose computing unit (e.g., desktop PC, laptop, etc.) or as other devices, such as set-top boxes, audio/video appliances, game consoles, and the like.

The client 404 runs an operating system 450, which is stored in memory 442 and executed on the secure processor 440. Operating system 450 represents any of a wide variety of operating systems, such as a multi-tasking, open platform system (e.g., a "Windows"-brand operating system from Microsoft Corporation).

Alternatively, the operating system 450 may include a local integrity ascertainer 452 that evaluates the digital goods (i.e., yellow code) prior to their utilization to determine whether the goods have been tampered with or modified. The local integrity ascertainer 452 is the exemplary integrity ascertainer (in whole or in part) of the exemplary integrity veracitor, described herein. In particular, the local integrity ascertainer 452 is configured to analyze the various portions according to the tamper-resistance (i.e., protection) scheme of the exemplary integrity veracitor.

The local integrity ascertainer 452 includes code portions that may be executed in these most secure areas of the operating system and secure processor. Although the local ascertainer 452 is illustrated as being integrated into the operating system 450, it may be implemented separately from the operating system.

In the event that the client detects some tamper activity, the secure processor 440 acting alone, or together with the operating system 450, may decline to execute the suspect digital code. For instance, the client may determine that the software product has been modified because the evaluations performed by the ascertainer 452 are not successful. In this case, the local ascertainer 452 informs the secure processor 440 and/or the operating system 450 of the suspect code and the secure processor 440 may decline to run that software product.

It is further noted that the operating system 450 may itself be the protected digital good. That is, the operating system 450 may be modified with various tamper-resistance (i.e., protection) schemes to produce a product that is difficult to copy and redistribute, or at least makes it easy to detect such copying. In this case, the secure processor 440 may be configured to detect an improper version of the operating system during the boot process (or at other times) and prevent the operating system from fully or partially executing and obtaining control of system resources.

For protected digital goods delivered over a network, the client 404 implements a tamper-resistant software (not shown or implemented as part of the operating system 450) to connect to the server 402 using an SSL (secure sockets layer) or other secure and authenticated connection to purchase, store, and utilize the digital good. The digital good may be encrypted using well-known algorithms (e.g., RSA) and compressed using well-known compression techniques (e.g., ZIP, RLE, AVI, MPEG, ASF, WMA, MP3).

Methodological Implementations of the Exemplary Integrity Veracitor

Figure 5:
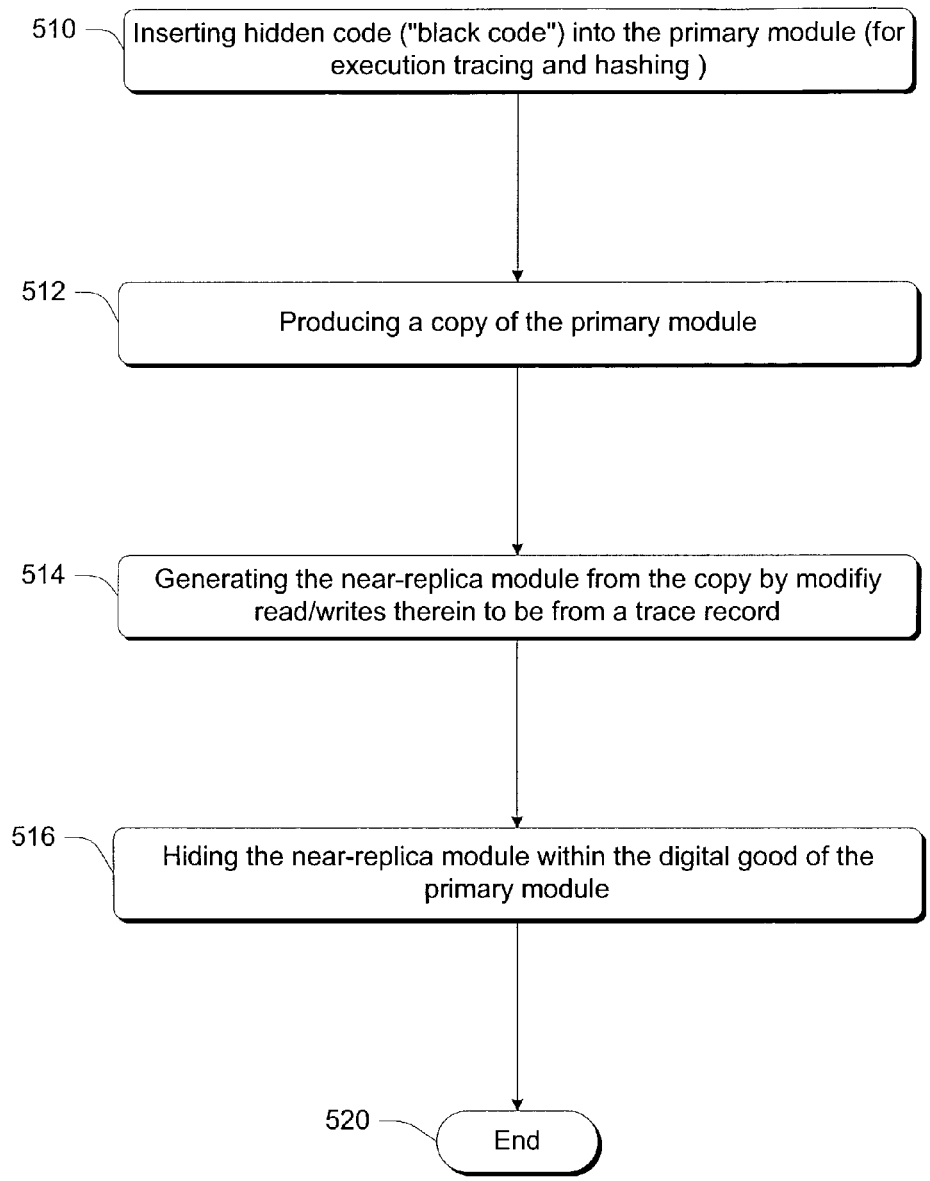
FIG. 5 is a flow diagram showing a methodological implementation described herein.
Figure 6:
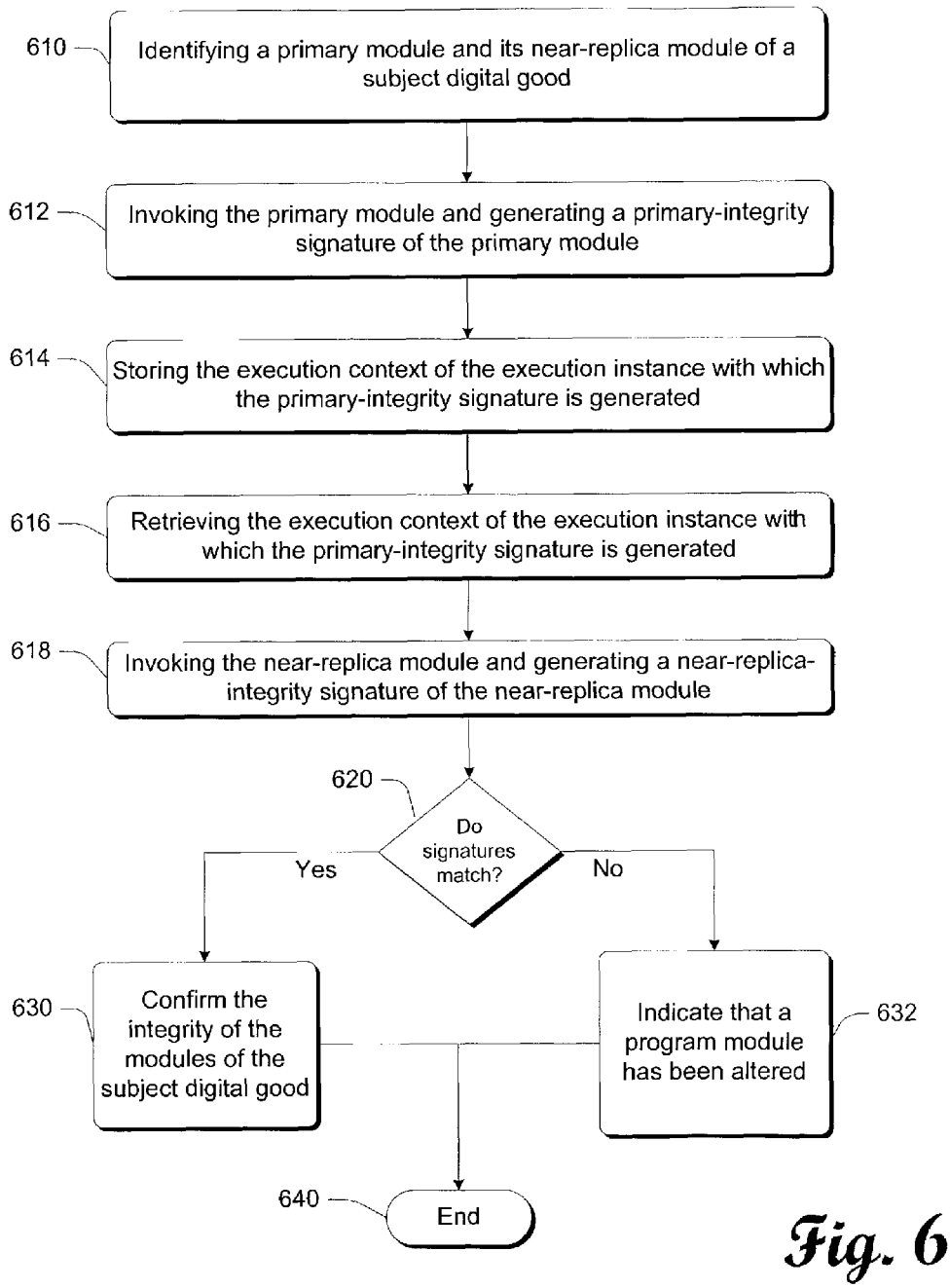
FIG. 6 is a flow diagram showing a methodological implementation described herein.

FIGS. 5 and 6 show methodological implementations of the exemplary integrity veracitor performed (in whole or in part) by an integrity veracitication system. These implementations may be performed by embodiments of the integrity ordainer 470; an integrity ascertainment system; and/or a computing environment like that shown in FIG. 13. These methodological implementations may be performed in software, hardware, or a combination thereof.

FIG. 5 shows a methodological implementation of the exemplary integrity ordainer performed (in whole or in part) by the integrity ordainer 470.

At 510, the exemplary integrity ordainer modifies original primary module of a digital good by strategically inserting hidden code ("black code") therein. At 512, it produces a replica of the modified primary module.

At 514, the replica is altered to generate a near-replica where the read/write instructions are replaced with instructions the retrieve/retrieve-and-check from a trace record. At 516, the near-replica is hidden within the digital good. At 520, this process ends.

FIG. 6 shows a methodological implementation of the exemplary integrity ascertainer performed (in whole or in part) by an integrity ascertainment system (e.g., local integrity ascertainer 452).

At 610, the exemplary integrity ascertainer identifies a primary module and its corresponding near-replica module of a subject digital good. At 612, it invokes the primary module and generating a primary-integrity signature of the primary module.

At 614, the exemplary integrity ascertainer stores the execution context of the execution instance with which the primary-integrity signature is generated. It accomplishes this, at least in part, by use of a trace record (like that record 320 of FIG. 3). At 616, the exemplary integrity ascertainer retrieves the execution context of the execution instance with which the primary-integrity signature is generated. At 618, it invokes the near-replica module and generates a near-replica-integrity signature of the near-replica module. At least portions of the actions of blocks 616 and 618 are typically performed somewhat coordinated fashion. For example, the exemplary integrity ascertainer may:

invoke the near-replica module with input parameters of the execution context;

while the near-replica module executes, values from the trace record (of the execution context) are retrieved;

after the execution instance of the near-replica module, the near-replica-integrity is generated.

At 620, the primary-integrity signature and near-replica-integrity signature are compared. If they are indistinguishable, then the integrity of the code is confirmed at 630. If they are distinguishable, then it is indicated that the code has been tampered with at 632. See FIGS. 1E and 1F. At 640, this process ends.

Other Implementation Details

Code obfuscation and various anti-debugging techniques have been used extensively in commercial software to thwart piracy attempts. Unfortunately, most of them may be defeated by determined hackers (i.e., attackers) within a manageable time period. The more tamper-resistance (e.g., obfuscation) techniques that include software, the more difficult it is for the hackers to crack the protection.

Many of the implementations of the exemplary integrity veracitor, described herein, employ a technique called "oblivious hashing." In general, oblivious hashing involves techniques that, for example, calculate a checksum of a code fragment by examining its actual executions rather than reading explicitly the code fragment.

At least one implementation of the exemplary integrity veracitor, described herein, computes a hash value of the data (such as architectural registers) along an execution path of a module, thereby implicitly providing a "signature" of the module's behavior given its input parameters and execution environment. When the hashing computation is seamlessly integrated into the original computation flow of the hashed module, oblivious hashing provides a stealthy means to verify software integrity.

Oblivious Hashing and Verification Using Primary/Near-Replica Model

At least one implementation takes snapshots of the intermediate states of the computer-executable instructions within a module during an execution instance of the module. The snapshots consist of the values of local variables, and are used to compute a hash value that serves as a fingerprint of the code.

Property of oblivious hashing: (1) Computing the integrity of a module without reading its code; (2) Having weak collision resistance in the following sense—given a module f and its hash value H(f)=h, it is hard to make 'minor' modifications to f such that the resulting module f' has the same hash value H(f')=h.

Automatic tool may be employed to inject code (e.g., "black code") into the program for taking snapshots and computing the hash value. The format of a program for that tool may be used with any level of language, which includes, for example:

abstract syntax trees (AST), a high-level intermediate language (e.g., C/C++ Intermediate Language (CIL)), machine level program binary (e.g., x86 program binary), and an intermediate language (for example Microsoft Intermediate Language (MSIL) for the Microsoft Common Language Runtime platform).

At least one implementation works with a format that has compiler front-end produces, for two reasons. First, there is adequate information about local variables, expressions, and types so that code and variables may be arbitrarily inserted. Second, the transformation performed by the compiler back-end may reasonably obfuscate the traces left by our insertions.

With at least one implementation, procedural hashing consists of three types of operations: hash-initialization, capture-and-hash (CH), and hash-output.

The initialization operation initializes one or more local variables, the hash registers, which will hold the result of on-going hash computation. These variables are created within the target module. A capture-and-hash operation is inserted after every expression in the original, un-hashed module. It takes the value of the expression and applies to a hash register using a checksum operation such as CRC. Multiple statements (expressions) in a compound statement (expressions) are captured and hashed individually. The hash-output operation writes the content of a hash register to a global store. With at least one implementation, the global store is part of a special data structure called trace record (like trace record 320 of FIG. 3).

Any modification of the hashed module is likely to result in a different hash value. In essence, an implementation has transformed the problem of verifying a module's code integrity to the problem of verifying the module's input-output behavior.

Such behavior depends on the execution context, which includes input parameters and external factors. External factors include, for example, global variables, system time, and so on, during the life time of the module. A system may prepare a set of known execution contexts and force many calls on the module, using the pre-determined contexts, outside the usual control flow of the program. However, such a system may only verify "purely-functional" modules—which are those without indirect memory references.

In reality, side effects such as global memory writes and system calls make it extremely difficult to call an arbitrary module outside the normal control flow without disrupting the correct execution of the program. Most modules in a real-life digital good have side effects.

One seemingly feasible solution is to prepare and restore the context that the module accesses and modifies during its execution. It roughly involves the following steps in preparing a forced execution of the module: (1) choosing an execution context, (2) saving the global data that the module may modify, and (3) setting up the global data for the chosen execution context. During the execution, some system calls are masked off with stubs. After the module returns, the caller must restore the global data to before the forced hashing call.

However, there are several drawbacks with the solution just described. First, determining a closure of global data that a module accesses and modifies is an undecidable problem in the abstract, and an extremely difficult problem in practice. Second, for a multi-threaded application, the global data that is modified during a forced call there within may cause other threads to misbehave. Although one may try suspending other threads during a forced call or play with virtual memory protection, these techniques also reveal to the hackers the protection scheme and location.

In addition, pre-determining a known set of execution contexts in order to stress test a module is not easily automated, for the same reason why it is difficult to determine the closure for a module's global data access. At best, one may design semi-automatic tools to help programmers generate the set of known execution contexts. That may just be impractical.

Instead of forced calls with known execution contexts, one may try to verify a module as it is being invoked naturally. In order to do this, a near-replica of the primary module is employed to "replay" its execution, and thereby obtain and verify the resulting signature. The primary module—within which may be embedded hidden code (such as that for execution tracing and hashing)—produces a record of its execution context in a secret location.

At some point later, the near-replica is invoked with the saved context to generate a signature. Since the execution context is captured as the primary executes, arbitrary input parameters and global data accesses may be fed to the near-replica.

Although static analysis is unnecessary for at least one implementation, its use may help reduce overhead. The diagram below illustrates the conceptual steps involved in verifying a target module using its replica. Note that the two hash values are compared by another module, and the comparison result is stored in a monitor variable.

Capturing the Execution Context with Trace Records

Given the same execution context, a module and its replica will execute identically and hence produce indistinguishable integrity signatures. It is a highly non-trivial task to determine at the compile time what global data a module may access during its invocation. One possible approach is to compute a closure of all possible references to the heap a module may ever make, and copy the closure to a different location. The replica is invoked with the new closure as its global context. But this requires, in most cases, a swizzling of pointers within the closure. This is tantamount to performing garbage collection, and is very difficult to get right with unsafe language such as C and C++. In addition, a lot of unnecessary data may be collected.

Another approach takes advantage of characteristics of a module's interface with external factors. With one such characteristic, references to external factors are made by individual read and write instructions. With at least one implementation, a replica of a module may be modified—thereby producing a near-replica—so that its "read" instructions retrieves the actual value read by the primary during its invocation. During the near-replica's invocation, it does not simply read a value from the same location from which the primary read. That is because that value may have changed since the primary read it. Rather, the near-replica retrieves the actual value read by the primary during its invocation from a specified memory location (i.e., trace record).

As shown in FIG. 3, every read from an external source (e.g., a heap) of a primary module 310 places the result of the read in a trace record (such as record 320 of FIG. 3), which corresponds to that primary module. Similarly, every write to an external source results in the to-be-written value placed similarly in the trace record. With at least one implementation, the trace record is organized in a first-in, first-out (FIFO) manner.

As shown in FIG. 3, in the near-replica module 330, every read instruction (of the primary module) that gets data from an external source (e.g., a heap) is converted into a retrieval operation (within the near-replica) from the corresponding trace record (such as record 320 of FIG. 3). In other words, the read instructions (from an external source) of the primary module are converted to retrieval instructions from the corresponding trace record within the near-replica module.

Similarly, every write instruction (of the primary module) that stores data to an external source extracts a value from the trace record and compares the value with that it is supposed to write. In other words, the write instructions (to an external location) of the primary module are converted to retrieval & check instructions from the corresponding trace record within the near-replica module.

At least one implementation employs an unbounded trace record because the primary module may contain a loop that may generate many insertions to the trace record.

With at least one implementation, the trace record used for storing the read and write results may be allocated for the entire module as illustrated in FIG. 3.

Multi-Record

Figure 7:
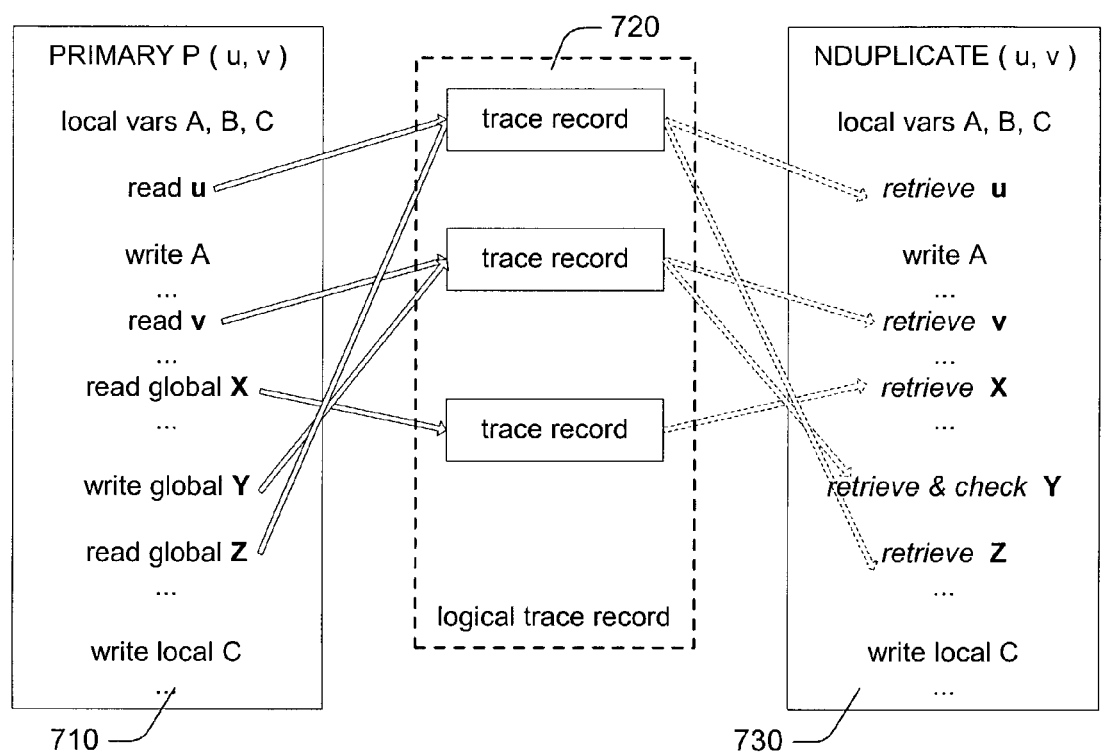
FIG. 7 is a block diagram graphically illustrating actions performed by an embodiment described herein and some of the components manipulated by such.

The trace record used for storing the read and write results may be allocated for the entire module as illustrated in FIG. 3 or a group of instructions as shown in FIG. 7. Herein, the former (shown in FIG. 3) is called a single-record and the latter (shown in FIG. 7) is called a multi-record.

FIG. 7 shows a primary module 710 and its near-replica module 730. With every read and global write, a copy of the read/written value is stored in one of the trace records of the logical trace record 720.

Using multiple trace records (of the logical trace record 720) offers the advantage that insertions and extractions look like updating and reading a large number of un-related global variables, and hence may fool the attackers. Implementing the use of multiple trace records are also easy because the trace insertion and extraction instructions may be generated that go into the primary and near-replica modules. The trace record may be tailored to individual instructions. For instructions that are not inside a loop, the amount of space they require in the trace records is fixed and known at the compile time. The trace records for these instructions may simply be collections of words instead of a FIFO trace record.

One may also achieve certain level of stealth with the single-record approach. For example, the trace record, in this case almost invariably a FIFO trace record TRACE RECORD, may be implemented as a splay tree, or a hash table, so that a casual peruse of the disassembled code will not reveal patterns of instructions for inserting into the FIFO trace record.

Using Encryption

The values stored in the trace record may be encrypted. Using encryption may help hide the fact that the value just read from the heap is being stored into another location. The cryptography keys may simply be constants or taken from the hash values computed along the computation. In addition, intermediate hash values may also be stored in the trace record so that the near-replica module may verify the primary at more than one point along the execution path.

For example, the primary module may encrypt the value of a parameter using the hash register's content up to a specific point. In its near-replica, the encrypted value is decrypted using the hash register that is calculated at that point. If both modules follow exactly the same execution, the value decrypted in the near-replica should be the correct value for the parameter.

Similarly, there is a safe transfer of the global variable between the primary and near-replica modules. There are many ways to create encryption/decryption pairs between the primary and the near-replica modules.

Capturing & Retrieving References

Typically, read/write instructions reference a parameter, a location in the heap, or a location on the stack. However, not all read/write instructions may be statically determined to be one of these three types. When this situation occurs, either inject run-time checks may be inserted to avoid capturing and retrieving the access to the stack or simply act conservatively and default to capturing and retrieving the instruction's result. Also, a module may access a stack variable in a module upstream in the calling chain. This may happen when pointers to local variables are passed as arguments. This may be addressed by treating all indirect accesses in the same way as global memory accesses.

It may be unnecessary to capture every global memory reference at times. For example, the primary module may first write and then read a variable. The near-replica does not need the value of the variable, because it may create the value all by itself. But doing this optimization requires some data flow analysis, and it is all that clear that the amount of savings in memory traffic and footprint will be worth the effort.

Tamper-Proofing Trace Records

A trace record is the link of information flow between the primary module and it near-replica. In at least one implementation, this link may be hidden that an attacker cannot easily discover the near-replica module. One approach is to insert code in other parts of the program to access the trace record, and possibly re-arrange its physical layout without changing the logical representation.

Figure 8:
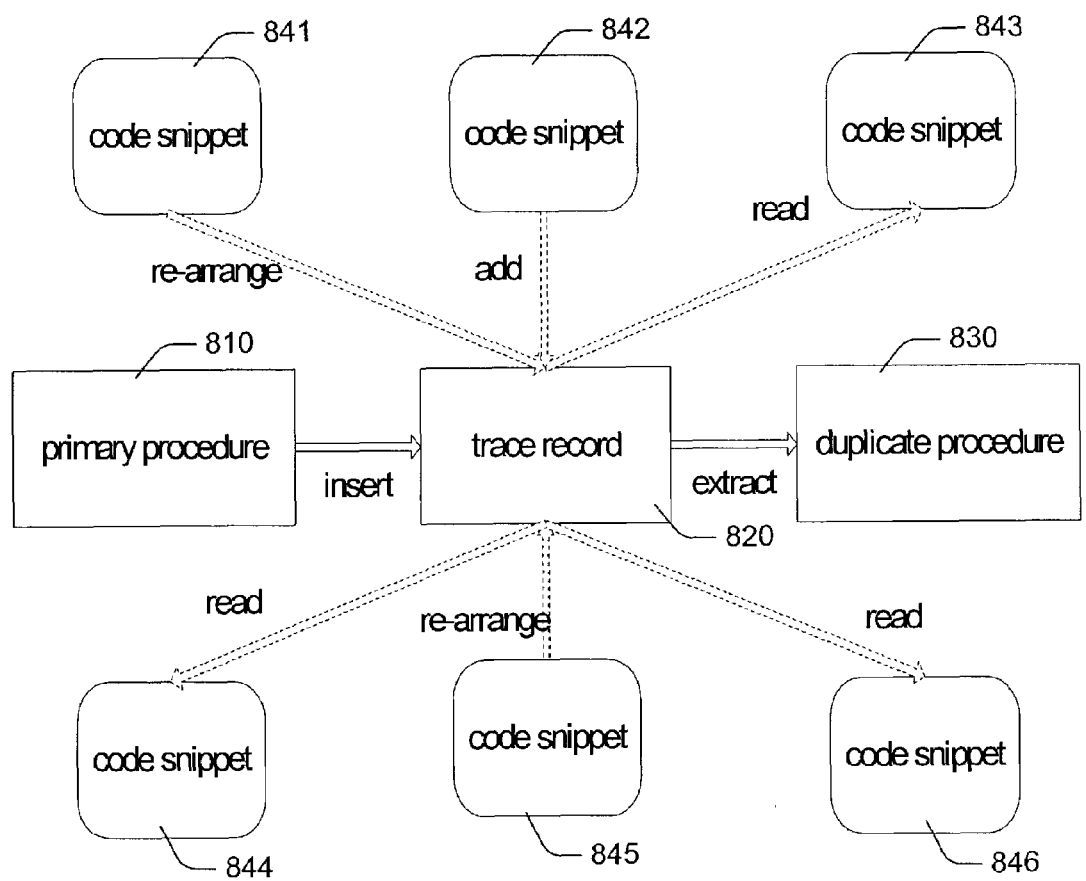
FIG. 8 is a block diagram graphically illustrating actions performed by an embodiment described herein and some of the components manipulated by such.

FIG. 8 illustrates this approach. A primary module 810 inserts values into a trace record 820. A near-replica module 830 extracts values from the record. Little code snippets (such as snippets 841–846) are scattered throughout other portions of the digital good. These snippets access the trace record, but effectively perform no substantive action.

The actions of the snippets are designed to increase the information overload that an attacker must process. Since these snippets are accessing the trace record 820, the accesses by the primary module 810 and near-replica module 830 does not appear to be unique.

There are virtually an infinite number of ways to re-arrange the physical layout of a trace record. For an implementation based on linked lists, swapping the physical locations of two nodes is one possible operation. A hash table-based implementation may use re-sizing and rehashing. An implementation using a priority tree, where the priority is the order in which items are inserted, allows many kinds of re-balancing operations. Other possibilities include insertion of extra nodes and expansion of one node into multiple nodes. These operations require that the extraction operations in the replica may recognize extraneous records.

Interleaved Execution of Near-Replica Modules

The addition of extraction and comparison instructions in the near-replica module, along with removal of procedural and system calls, results in a near-replica module that looks quite different from the primary module, which has insertion instructions. Despite that, a clever attacker may still be able to spot a near-replica module.

To further hide the location of a near-replica module, at least one implementation breaks it up into basic blocks and spreads them throughout the program and interleaves execution of the near-replica module along with other modules in the program.

With one implementation employing interleaved execution, a module is decomposed into chunks. Each chunk consists of one or more basic blocks. The first instruction of a chunk may serve as a branch target. In other words, there are no branches into the middle of a chunk. The simplest decomposition is to treat every basic block as a chunk.

Each chunk is embedded in a host module. One chunk may appear in more than one host module. A logical execution is carried from a chunk to another when the hosts are executed. There are no explicit branches taken between chunks.

Figure 9:
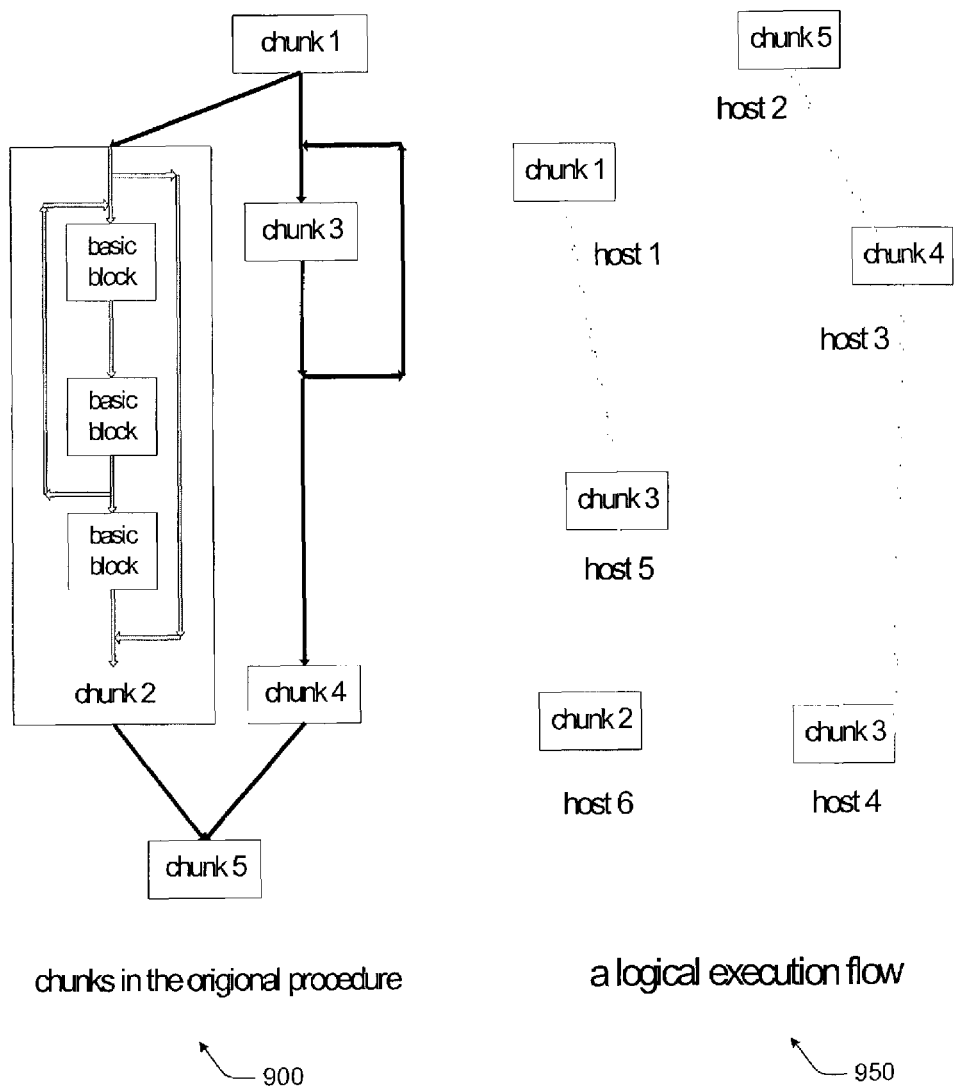
FIG. 9 is a block diagram graphically illustrating actions performed by an embodiment described herein and some of the components manipulated by such.

FIG. 9 illustrates an example (in "chunks in the original procedure" 900) of how a module may be decomposed into chunks and how a logical execution occurs among these chunks. The execution sequence of the hosts is unlikely to correspond to the required execution order of the chunks. As shown in "logical execution flow" 950 of FIG. 9, the order of host module invocation may be host1, host3, host5, host 1, host4, host 6, host 2, host3, host 1, host2, and so on. Only the ones underlined will invoke the embedded chunks to carry out a logical execution of the split module.

A logical execution may be realized by two devices: a transition variable and a local state store. Each chunk is assigned a chunk id. A transition variable is established to hold the id of next chunk to be executed. It is initialized to the id of the first chunk in the module. When a chunk is reached in a host, a comparison is made between the chunk's id and the transition variable. If they are equal, the chunk is executed. At the end of the chunk, or when the chunk needs to branch to another chunk, the target chunk's id is saved in the transition variable, and execution resumes in the host module.

Figure 10:
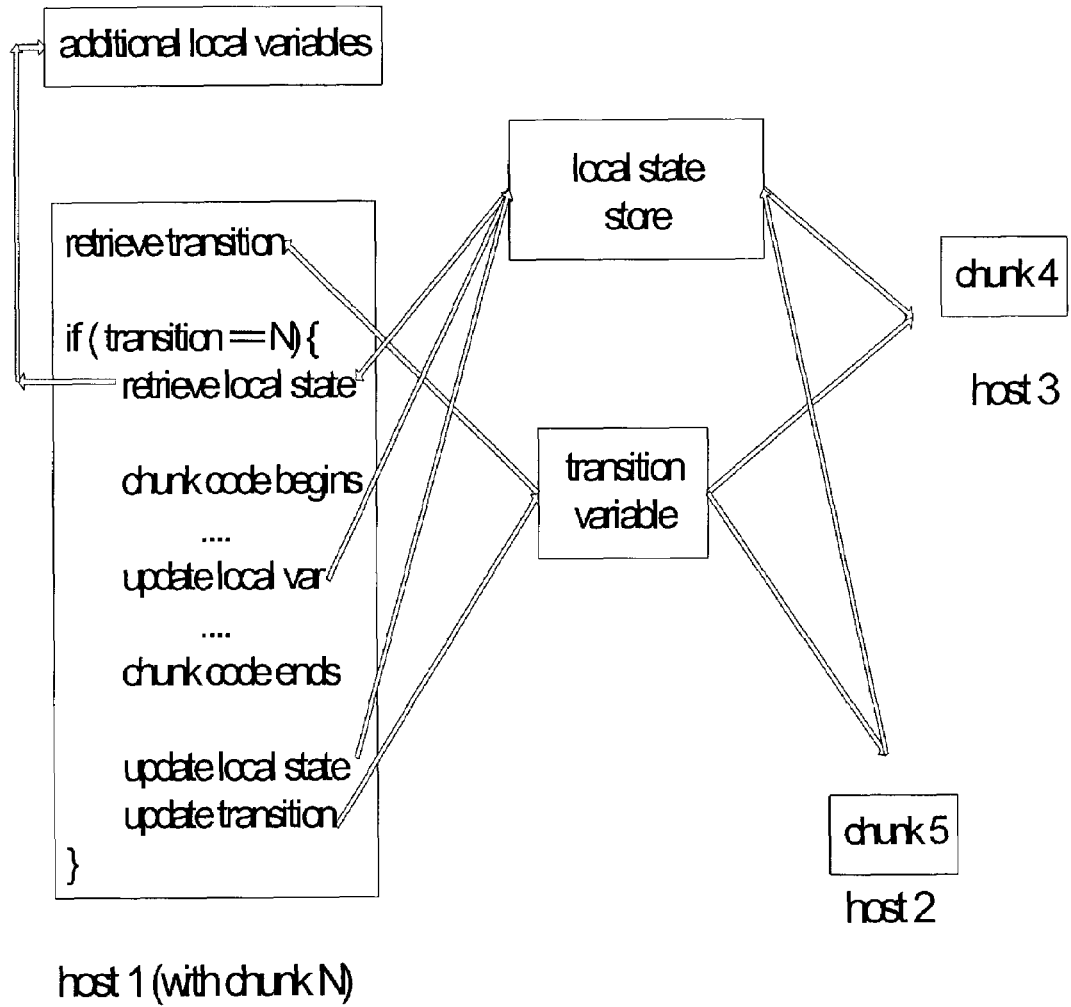
FIG. 10 is a block diagram graphically illustrating actions performed by an embodiment described herein and some of the components manipulated by such.

As shown in diagram 1000 of FIG. 10, the local state of the split module must be preserved between chunk invocations. The host module may be modified to include local variables that appear in the pre-split near-replica module, renaming the variables if necessary. When execution ends in a chunk, the local variables are copied to a secret location which will then be picked up by next chunk when it starts.

An implementation may augment the trace record data structure to include storage for the local state and the chunking state variable. Many techniques used for obfuscating the global trace are also applicable to saving and restoring the local context.

Monitors and Propagation Networks

With at least one implementation, the results of checking primary modules against their near-replicas may be stored in tamper-resistant variables called monitors. Each checking of a primary/near-replica pair updates one or more monitors. The monitors may be logically represented as Boolean variables, although their physical implementation may assume different forms, for example, bit vectors, known constants, pointers, or invariants on dynamic data structures. A monitor is always associated with a set of primary modules. A true value indicates that no tampering has been found on the monitored primary modules. A false value indicates that at least one of them has been found to be compromised.

Figure 11:
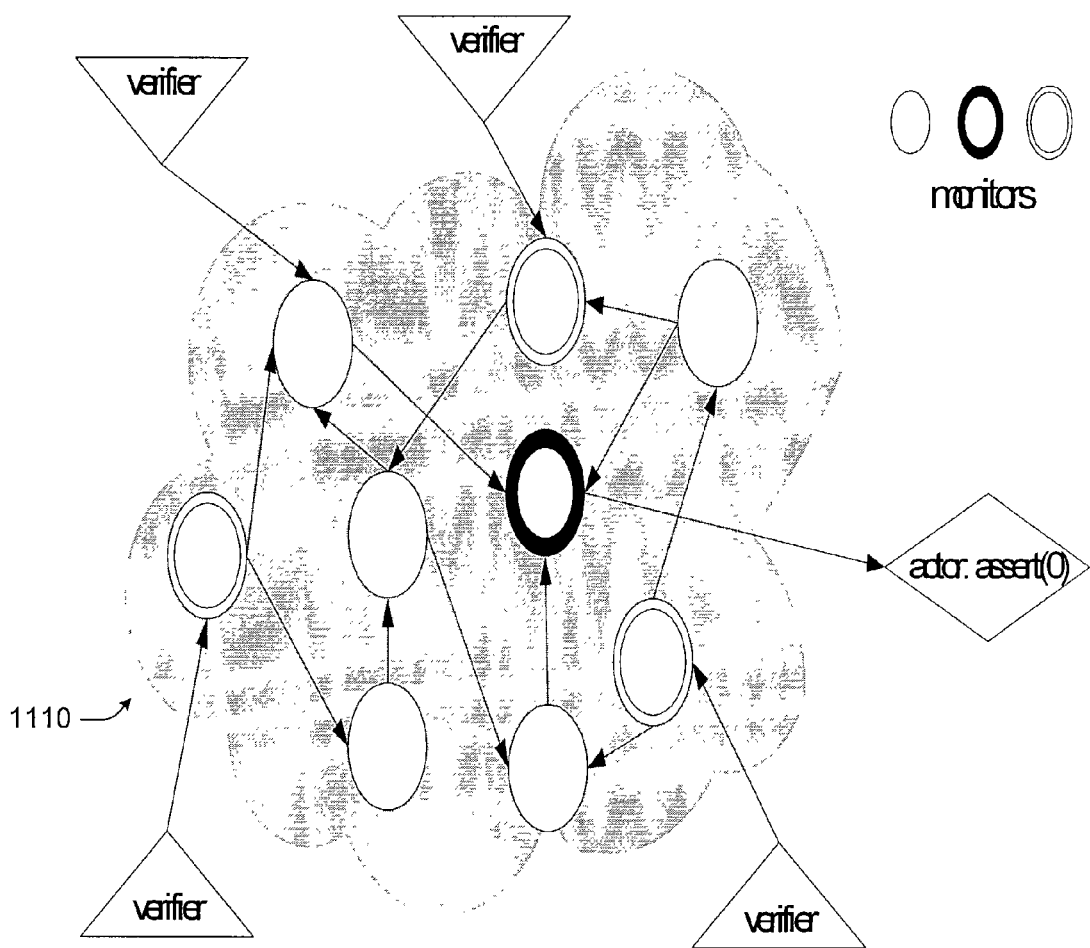
FIG. 11 is a block diagram graphically illustrating actions performed by an embodiment described herein and some of the components manipulated by such.

Two operations are defined on a monitor: set and test. The semantics are just as implied by their names. A monitor may be set by two types of agents: verifiers and relays. A verifier verifies the integrity of a module and sets the monitor to the result of the verification. A relay tests one or more monitors, and upon finding at least one monitor in the false state, sets one or more monitors to the false state As shown in FIG. 11, monitors and relays form a propagation network. The monitors are the vertices 1110. A directed edge exists between two monitors if there is a relay that tests one monitor and sets the other. Information on the integrity of the program flows in through the verifiers, and is spread throughout the network via relays. Besides the relays, actors are placed in the program to test some monitors and trigger program failures if the test turns out negative.

As shown in FIG. 11, a propagation network delays the firing of intentional program failures from the moment a tampering is discovered. An attack now faces a tremendously difficult task of back-tracking the propagation through the network to find out which verifier causes the program failure.

The monitor state need not be Boolean. The monitor may have a counter. It records the number of verifiers that have detected code tampering. The implementation is slightly complicated.

Forming Cross Dependencies Among Target Modules

Figure 12:
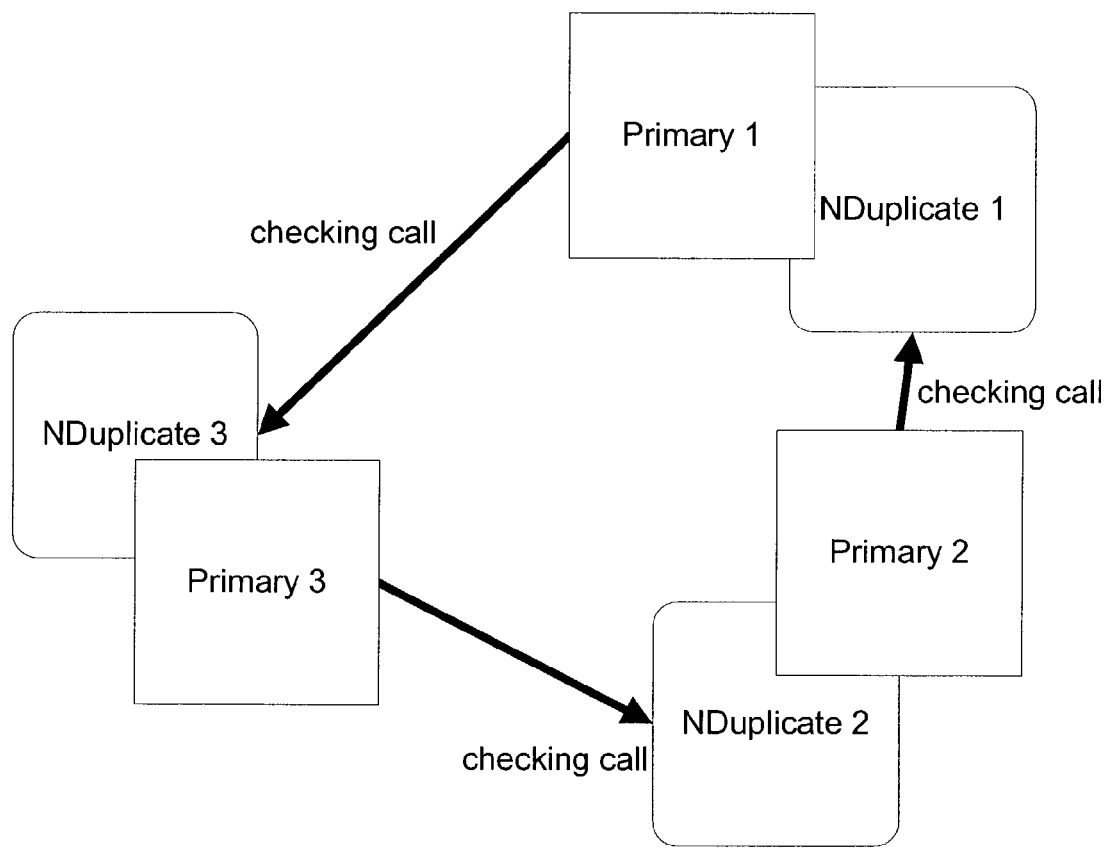
FIG. 12 is a block diagram graphically illustrating actions performed by an embodiment described herein and some of the components manipulated by such.

With at least one implementation, there may be a mutual verification among a group of modules. One approach, as shown in FIG. 12, is to arrange a number of modules in a cycle, make each module call the near-replica of its predecessor to verify its integrity.

A High-level View and the Hardness Property

At the high level, at least one implementation creates implicit dependencies among various components of a digital good. Proper execution of one component depends on the code integrity of another component. Integrity dependencies may be created among many components in a digital good and their existence is invisible to compiler-based static analysis. The only way for an attacker to detect an integrity dependency is to run the program and go through trials and errors by running the program.

With conventional tamper-resistance, an attacker may uncover and remove an integrity dependency with a reasonable amount of patience and the aid of automated tools, unless there is a complex web that ties all these dependencies together. An isolated integrity dependency may be discovered by modifying the code component and observing the program behavior. With thousands of hackers out there, it won't be long before all isolated integrity checks are discovered by trials and errors. One option is to use these one or both of these two orthogonal techniques: postpone the onset of an anomalous behavior and have integrity checks that depend on each other.

Postpone the Onset of an Anomalous Behavior

The first technique is to postpone the onset of an anomalous behavior of the program till several integrity dependencies have failed. This feature prevents an attacker from pin-pointing the integrity dependencies that are embed in the program. To see how this work, assume that code components (or modules) C1, C2, . . . , and CL have embedded within them oblivious hashing checks (like that described herein), and that the execution state of Ci depends on the integrity of Ci−1. Although Ci need not be called as a result of Ci−1, there should be at least a non-zero probability (e.g., 20%) that Ci runs sometime after Ci−1 is invoked; it is entirely possible that between the invocation of Ci−1 and that of Ci, Ci+1 and other code components are called. What this means is that if the attacker modifies code block C1, with a probability close to 1 the execution state of C2 will become different from that if C1 has not been tampered with.

Furthermore, there will be many code blocks including other Ci's, which may run immediately after Ci is called. If a system is designed in such a way that the program starts to exhibit anomalous behaviors after the modification (corruption) of Ci is propagated through at least L links, the attacker is faced with a tremendous difficulty to determine what these links are. The attacker has at hand a list of module calls, starting from C1 and ending at CL.

All the attacker may infer is that his modification of C1 causes CL to fail. This information is not enough for the attacker to know what the correct fixes should be, because in a way information is propagated and mutated along L links before it finally reaches CL. In order to learn exactly what has happened, the attacker essentially has to determine all the intermediate links from C1 to CL By making it very difficult to backtrack from the failure point, the amount of work an attacker has to perform in discovering the integrity checks is significantly increased.

Integrity Checks that Depend on Each Other

The second defensive technique, as already alluded to above, is to make integrity checks depend on each other. A cyclic dependency is created for a group of modules whose integrity is to be ensured. For example, a group of modules C1, C2 ... and CL may form an integrity dependency cycle C1→C2→ ... →CL→C1 such that if one or more modules in the cycle are tampered with, the "corruption" will propagate along the cycle and result in corruption, and eventually mal-behavior of other modules on the cycle. Given N number of protected modules, there are roughly N2 number of such cycles in the program. An attacker must discover all cycles containing a module f, and figure how to modify the modules on the cycles in order to modify or remove f without causing the program to fail.

Exemplary Computing System and Environment

Figure 13:
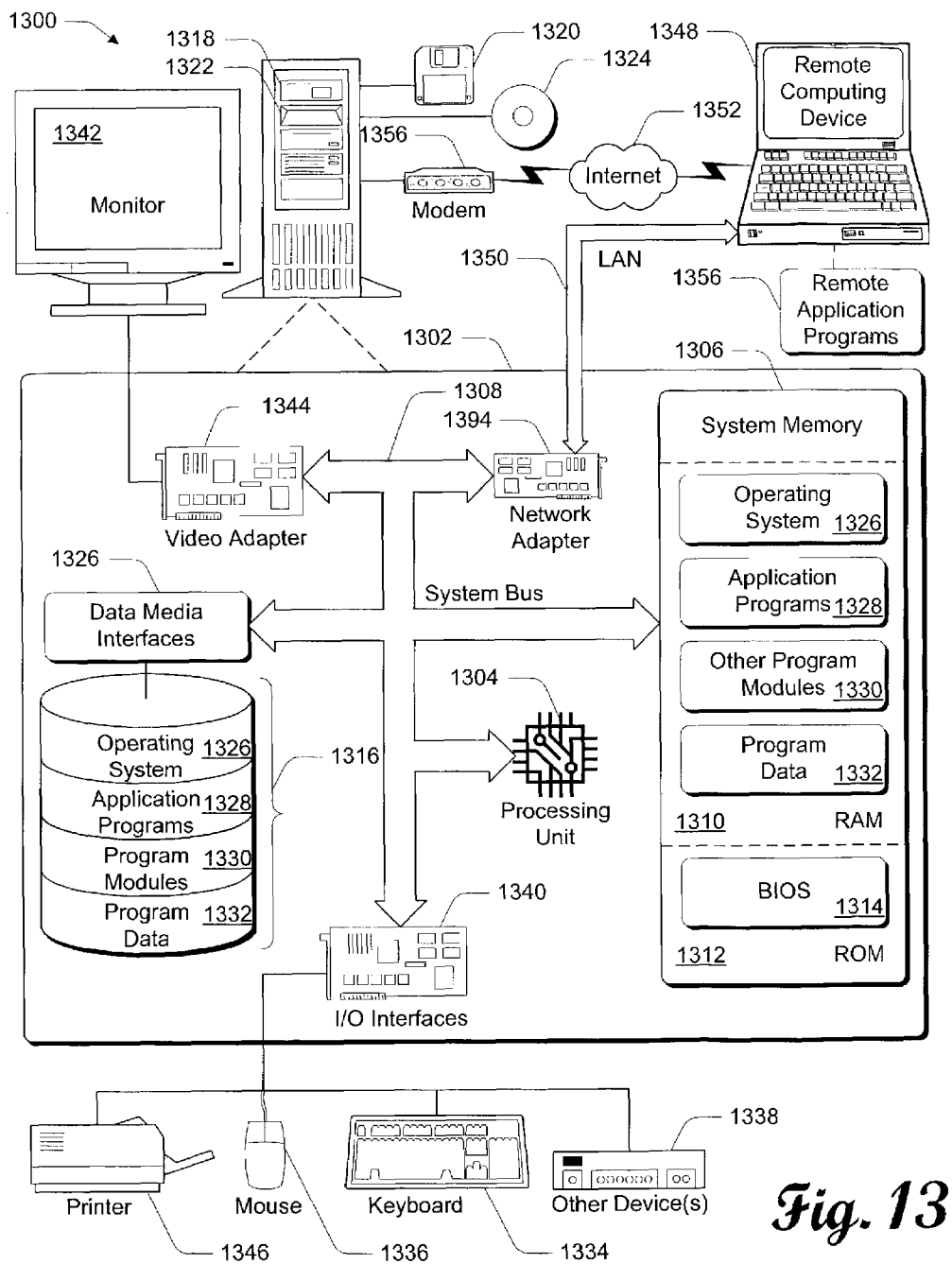
FIG. 13 is an example of a computing operating environment capable of implementing at least one embodiment (wholly or partially) described herein.

FIG. 13 illustrates an example of a suitable computing environment 1300 within which an exemplary integrity veracitor, as described herein, may be implemented (either fully or partially). The computing environment 1300 may be utilized in the computer and network architectures described herein.

The exemplary computing environment 1300 is only one example of a computing environment and is not intended to suggest any limitation as to the scope of use or functionality of the computer and network architectures. Neither should the computing environment 1300 be interpreted as having any dependency or requirement relating to any one or combination of components illustrated in the exemplary computing environment 1300.

The exemplary integrity veracitor may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary integrity veracitor may be described in the general context of computer-executable instructions, such as program modules, being executed by a computer. Generally, program modules include routines, programs, objects, components, data structures, etc. that perform particular tasks or implement particular abstract data types. The exemplary integrity veracitor may also be practiced in distributed computing environments where tasks are performed by remote processing devices that are linked through a communications network. In a distributed computing environment, program modules may be located in both local and remote computer storage media including memory storage devices.

The computing environment 1300 includes a general-purpose computing device in the form of a computer 1302. The components of computer 902 may include, by are not limited to, one or more processors or processing units 904, a system memory 1306, and a system bus 1308 that couples various system components including the processor 1304 to the system memory 1306.

The system bus 1308 represents one or more of any of several types of bus structures, including a memory bus or memory controller, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 1302 typically includes a variety of computer readable media. Such media may be any available media that is accessible by computer 1302 and includes both volatile and non-volatile media, removable and non-removable media.

The system memory 1306 includes computer readable media in the form of volatile memory, such as random access memory (RAM) 1310, and/or non-volatile memory, such as read only memory (ROM) 1312. A basic input/output system (BIOS) 1314, containing the basic routines that help to transfer information between elements within computer 1302, such as during start-up, is stored in ROM 1312. RAM 1310 typically contains data and/or program modules that are immediately accessible to and/or presently operated on by the processing unit 1304.

Computer 1302 may also include other removable/non-removable, volatile/non-volatile computer storage media. By way of example, FIG. 13 illustrates a hard disk drive 1316 for reading from and writing to a non-removable, non-volatile magnetic media (not shown), a magnetic disk drive 1318 for reading from and writing to a removable, non-volatile magnetic disk 1320 (e.g., a "floppy disk"), and an optical disk drive 1322 for reading from and/or writing to a removable, non-volatile optical disk 1324 such as a CD-ROM, DVD-ROM, or other optical media. The hard disk drive 1316, magnetic disk drive 1318, and optical disk drive 1322 are each connected to the system bus 1308 by one or more data media interfaces 1326. Alternatively, the hard disk drive 1316, magnetic disk drive 1318, and optical disk drive 1322 may be connected to the system bus 908 by one or more interfaces (not shown).

The disk drives and their associated computer-readable media provide non-volatile storage of computer readable instructions, data structures, program modules, and other data for computer 1302. Although the example illustrates a hard disk 1316, a removable magnetic disk 1320, and a removable optical disk 1324, it is to be appreciated that other types of computer readable media which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 1316, magnetic disk 1320, optical disk 1324, ROM 1312, and/or RAM 1310, including by way of example, an operating system 1326, one or more application programs 1328, other program modules 1330, and program data 1332.

A user may enter commands and information into computer 1302 via input devices such as a keyboard 1334 and a pointing device 1336 (e.g., a "mouse"). Other input devices 1338 (not shown specifically) may include a microphone, joystick, game pad, satellite dish, serial port, scanner, and/or the like. These and other input devices are connected to the processing unit 1304 via input/output interfaces 1340 that are coupled to the system bus 1308, but may be connected by other interface and bus structures, such as a parallel port, game port, or a universal serial bus (USB).

A monitor 1342 or other type of display device may also be connected to the system bus 1308 via an interface, such as a video adapter 1344. In addition to the monitor 1342, other output peripheral devices may include components such as speakers (not shown) and a printer 1346 which may be connected to computer 1302 via the input/output interfaces 1340.

Computer 1302 may operate in a networked environment using logical connections to one or more remote computers, such as a remote computing device 1348. By way of example, the remote computing device 1348 may be a personal computer, portable computer, a server, a router, a network computer, a peer device or other common network node, and the like. The remote computing device 948 is illustrated as a portable computer that may include many or all of the elements and features described herein relative to computer 1302.

Logical connections between computer 1302 and the remote computer 1348 are depicted as a local area network (LAN) 1350 and a general wide area network (WAN) 1352. Such networking environments are commonplace in offices, enterprise-wide computer networks, intranets, and the Internet.

When implemented in a LAN networking environment, the computer 1302 is connected to a local network 1350 via a network interface or adapter 1354. When implemented in a WAN networking environment, the computer 1302 typically includes a modem 1356 or other means for establishing communications over the wide network 1352. The modem 1356, which may be internal or external to computer 1302, may be connected to the system bus 1308 via the input/output interfaces 1340 or other appropriate mechanisms. It is to be appreciated that the illustrated network connections are exemplary and that other means of establishing communication link(s) between the computers 1302 and 1348 may be employed.

In a networked environment, such as that illustrated with computing environment 1300, program modules depicted relative to the computer 1302, or portions thereof, may be stored in a remote memory storage device. By way of example, remote application programs 1358 reside on a memory device of remote computer 1348. For purposes of illustration, application programs and other executable program components such as the operating system are illustrated herein as discrete blocks, although it is recognized that such programs and components reside at various times in different storage components of the computing device 1302, and are executed by the data processor(s) of the computer.

Computer-Executable Instructions

An implementation of an exemplary integrity veracitor may be described, in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 13 illustrates an example of a suitable operating environment 1300 in which an exemplary integrity veracitor may be implemented. Specifically, the exemplary integrity veracitor(s) described herein may be implemented (wholly or in part) by any program modules 1328–1330 and/or operating system 1326 in FIG. 13 or a portion thereof.

The operating environment is only an example of a suitable operating environment and is not intended to suggest any limitation as to the scope or use of functionality of the exemplary integrity veracitor(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary integrity veracitor may be stored on or transmitted across some form of computer readable media. Computer readable media may be any available media that may be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method for facilitating the tamper-resistance of computer-executable instructions, the method comprising:

obtaining a first execution-identifying signature of a first program module, the first signature represents one or more execution instances of the first program module with a first execution context, the first program module comprising one or more computer-executable instructions;

obtaining a second execution-identifying signature of a second program module, wherein the second execution-identifying signature is created by retrieving values from a trace record that resulted from execution of the first program module, the second signature represents one or more execution instances of the second program module with a second execution context, the second program module comprising one or more computer-executable instructions;

comparing the first and the second signatures; and authenticating the second program module if the signatures are indistinguishable, wherein the second program module is a near copy of the first program module.

2. A method as recited in claim 1, further comprising providing the first execution context with input parameters for an execution instance of the first program module and external factors to the execution instance of the first program module, wherein references to the external factors are made by individual read and write instructions.

3. A method as recited in claim 1, further comprising providing the second execution context with input parameters for an execution instance of the first program module and factors external to the execution instance of the first program module, wherein references to the external factors are made by individual read and write instructions.

4. A method as recited in claim 1, further comprising providing program modules having distinct execution-identifying signatures that indicate that such program modules have distinct computer-executable instructions.

5. A method as recited in claim 1, further comprising providing program modules having distinct execution-identifying signatures that indicate one or more execution instances of computer-executable instructions that are distinct between such modules.

6. A method as recited in claim 1, further comprising providing program modules having distinct execution-identifying signatures that indicate one or more execution instances of computer-executable instructions that are distinct between such modules, wherein the execution instances of such modules utilize indistinguishable execution contexts.

7. A method as recited in claim 1 further comprising comparing the first signature and the second signature.

8. A method as recited in claim 1 further comprising:
comparing the first and the second signatures;
indicating whether the signatures are indistinguishable.

9. A computer storage media having computer-executable instructions that, when executed by a computer, performs a method as recited in claim 1.

10. A computer comprising one or more computer-readable media having computer-executable instructions that, when executed by the computer, perform a method as recited in claim 1.

11. A method for facilitating the tamper-resistance of computer-executable instructions, the method comprising:

obtaining a first integrity signature of a first program module, the first signature represents one or more execution instances of the first program module with an execution context, the first program module comprising one or more computer-executable instructions; and obtaining a second integrity signature of a second program module, wherein the second execution-identifying signature is created by retrieving values from a trace record that resulted from execution of the first program module, the second signature represents one or more execution instances of the second program module with the execution context, the second program module comprising one or more computer-executable instructions;

comparing the first and the second signatures; and authenticating the second program module if the signatures are indistinguishable, wherein the second program module is a near copy of the first program module.

12. A method as recited in claim 11, further comprising providing the execution context with input parameters for an execution instance of the first program module and external factors to the execution instance of the first program module, wherein references to the external factors are made by individual read and write instructions.

13. A method as recited in claim 11, further comprising providing the second execution context with input parameters for an execution instance of the first program module and factors external to the execution instance of the first program module, wherein such factors are selected from a group consisting of global variables, virtual memory states, operating system states, input/output (I/O) system calls, other processes, system environment stacks, heaps, reading files or other external data, or system clock.

14. A method as recited in claim 11, further comprising providing the first integrity signature with an execution-identifying signature that represents at least one execution instance of the first program module with the execution context.

15. A method as recited in claim 11, further comprising providing the second integrity signature with an execution-identifying signature that represents at least one execution instance of the second program module with the execution context.

16. A computer storage media having computer-executable instructions that, when executed by a computer, perform a method as recited in claim 11.

* * * * *